(12) United States Patent
Burrow

(10) Patent No.: US 10,996,029 B2
(45) Date of Patent: *May 4, 2021

(54) POLYMER AMMUNITION AND CARTRIDGE PRIMER INSERT

(71) Applicant: TRUE VELOCITY IP HOLDINGS, LLC, Garland, TX (US)

(72) Inventor: Lonnie Burrow, Carrollton, TX (US)

(73) Assignee: TRUE VELOCITY IP HOLDINGS, LLC, Garland, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/744,552

(22) Filed: Jan. 16, 2020

(65) Prior Publication Data
US 2020/0208950 A1    Jul. 2, 2020

Related U.S. Application Data

(60) Continuation of application No. 16/111,715, filed on Aug. 24, 2018, now Pat. No. 10,571,230, which is a
(Continued)

(51) Int. Cl.
*F42B 5/307* (2006.01)
*F42C 19/08* (2006.01)
(Continued)

(52) U.S. Cl.
CPC ............... *F42B 5/30* (2013.01); *F42B 5/02* (2013.01); *F42B 5/025* (2013.01); *F42B 5/307* (2013.01);
(Continued)

(58) Field of Classification Search
CPC .... F42B 5/02; F42B 5/025; F42B 5/26; F42B 5/30; F42B 5/307; F42B 5/313;
(Continued)

(56) References Cited

U.S. PATENT DOCUMENTS

| 99,528 A | 2/1870 | Boyd |
| 113,634 A | 4/1871 | Crispin |

(Continued)

FOREIGN PATENT DOCUMENTS

| CA | 2813634 A1 | 4/2012 |
| CN | 102901403 B | 6/2014 |

(Continued)

OTHER PUBLICATIONS

AccurateShooter.com Daily Bulletin "New PolyCase Ammunition and Injection-Molded Bullets" Jan. 11, 2015.
(Continued)

*Primary Examiner* — James S Bergin
(74) *Attorney, Agent, or Firm* — Singleton Law, PLLC; Chainey P. Singleton

(57) ABSTRACT

The present invention provides a polymer ammunition cartridge having a primer insert having: a top surface; a bottom surface opposite the top surface; a coupling element that extends from the bottom surface, wherein the coupling element comprises an interior surface and an exterior surface, wherein the interior surface comprises: a transition region that transitions from the bottom surface to a second segment wherein the transition region has a radius of from 0.1 to 0.2; a first segment extending from the second segment and terminates at a tip, wherein the first segment has a first segment distance from 0.06 to 0.14 inches and the second segment has a second segment distance from 0.05 to 0.15 inches, wherein the second segment has a second segment angle from +3 to −3 degrees relative to the first segment angle and the first segment has a first segment angle from +6 to −6 degrees from perpendicular to the top surface; a primer recess in the top surface that extends toward the bottom surface; a primer flash aperture positioned in the primer recess through the bottom surface; and a flash
(Continued)

aperture groove in the primer recess and positioned around the primer flash aperture and adapted to receive a polymer overmolding through the primer flash aperture.

19 Claims, 6 Drawing Sheets

Related U.S. Application Data continuation of application No. 15/911,544, filed on Mar. 5, 2018, now Pat. No. 10,352,664, which is a continuation of application No. 15/406,844, filed on Jan. 16, 2017, now Pat. No. 9,933,241, which is a continuation of application No. 14/011,202, filed on Aug. 27, 2013, now Pat. No. 9,546,849, which is a division of application No. 13/292,843, filed on Nov. 9, 2011, now Pat. No. 8,561,543.

(60) Provisional application No. 61/456,664, filed on Nov. 10, 2010.

(51) Int. Cl.
| | |
|---|---|
| *F42B 5/30* | (2006.01) |
| *F42B 33/00* | (2006.01) |
| *F42B 5/02* | (2006.01) |
| *F42B 33/02* | (2006.01) |
| *F42B 5/313* | (2006.01) |
| *F42B 33/04* | (2006.01) |
| *B22F 3/00* | (2021.01) |
| *B22F 3/10* | (2006.01) |
| *B22F 3/22* | (2006.01) |
| *B22F 5/00* | (2006.01) |
| *B22F 5/06* | (2006.01) |
| *C04B 35/64* | (2006.01) |
| *C22C 1/04* | (2006.01) |
| *C22C 14/00* | (2006.01) |
| *C22C 33/02* | (2006.01) |
| *C22C 38/02* | (2006.01) |
| *C22C 38/04* | (2006.01) |
| *C22C 38/18* | (2006.01) |
| *C22C 38/42* | (2006.01) |
| *C22C 38/44* | (2006.01) |
| *C22C 38/48* | (2006.01) |
| *C22C 38/58* | (2006.01) |

(52) U.S. Cl.
CPC ............ *F42B 33/00* (2013.01); *F42B 33/001* (2013.01); *F42B 33/02* (2013.01); *F42C 19/083* (2013.01); *F42C 19/0807* (2013.01); *F42C 19/0823* (2013.01); *B22F 3/004* (2013.01); *B22F 3/10* (2013.01); *B22F 3/1025* (2013.01); *B22F 3/225* (2013.01); *B22F 5/00* (2013.01); *B22F 5/06* (2013.01); *B22F 2998/10* (2013.01); *C04B 35/64* (2013.01); *C22C 1/0458* (2013.01); *C22C 14/00* (2013.01); *C22C 33/0257* (2013.01); *C22C 33/0285* (2013.01); *C22C 38/02* (2013.01); *C22C 38/04* (2013.01); *C22C 38/18* (2013.01); *C22C 38/42* (2013.01); *C22C 38/44* (2013.01); *C22C 38/48* (2013.01); *C22C 38/58* (2013.01); *F42B 5/313* (2013.01); *F42B 33/04* (2013.01)

(58) Field of Classification Search
CPC ........ F42B 33/00; F42B 33/001; F42B 33/02; F42B 33/0207; F42B 33/04; F42C 19/08; F42C 19/0807; F42C 19/0815; F42C 19/0823; F42C 19/083; B21D 51/54

USPC .................................................. 102/464–470
See application file for complete search history.

(56) References Cited

U.S. PATENT DOCUMENTS

| | | |
|---|---|---|
| 130,679 A | 8/1872 | Whitmore |
| 159,665 A | 2/1875 | Gauthey |
| 169,807 A | 11/1875 | Hart |
| 207,248 A | 8/1878 | Bush et al. |
| 462,611 A | 11/1891 | Comte de Sparre |
| 475,008 A | 5/1892 | Bush |
| 498,856 A | 6/1893 | Overbaugh |
| 498,857 A | 6/1893 | Overbaugh |
| 640,856 A | 1/1900 | Bailey |
| 662,137 A | 11/1900 | Tellerson |
| 676,000 A | 6/1901 | Henneberg |
| 743,242 A | 11/1903 | Bush |
| 865,979 A | 9/1907 | Bailey |
| 869,046 A | 10/1907 | Bailey |
| 905,358 A | 12/1908 | Peters |
| 957,171 A | 5/1910 | Loeb |
| 963,911 A | 7/1910 | Loeble |
| 1,060,817 A | 5/1913 | Clyne |
| 1,060,818 A | 5/1913 | Clyne |
| 1,064,907 A | 6/1913 | Hoagland |
| 1,187,464 A | 6/1916 | Offutt |
| 1,936,905 A | 11/1933 | Gaidos |
| 1,940,657 A | 12/1933 | Woodford |
| 2,294,822 A | 9/1942 | Norman |
| 2,465,962 A | 3/1949 | Allen et al. |
| 2,654,319 A | 10/1953 | Roske |
| 2,823,611 A | 2/1958 | Thayer |
| 2,862,446 A | 12/1958 | Lars |
| 2,918,868 A | 12/1959 | Lars |
| 2,936,709 A | 5/1960 | Seavey |
| 2,953,990 A | 9/1960 | Miller |
| 2,972,947 A | 2/1961 | Fitzsimmons et al. |
| 3,034,433 A | 5/1962 | Karl |
| 3,099,958 A * | 8/1963 | Daubenspeck ........... F42B 7/06 102/449 |
| 3,157,121 A | 11/1964 | Daubenspeck et al. |
| 3,159,701 A | 12/1964 | Herter |
| 3,170,401 A | 2/1965 | Johnson et al. |
| 3,171,350 A | 3/1965 | Metcalf et al. |
| 3,242,789 A | 3/1966 | Woodring |
| 3,256,815 A | 6/1966 | Davidson et al. |
| 3,288,066 A | 11/1966 | Hans et al. |
| 3,292,538 A | 12/1966 | Hans et al. |
| 3,332,352 A | 7/1967 | Olson et al. |
| 3,444,777 A | 5/1969 | Lage |
| 3,446,146 A | 5/1969 | Stadler et al. |
| 3,485,170 A | 12/1969 | Scanlon |
| 3,485,173 A | 12/1969 | Morgan |
| 3,491,691 A | 1/1970 | Vawter |
| 3,565,008 A | 2/1971 | Gulley et al. |
| 3,590,740 A | 7/1971 | Herter |
| 3,609,904 A | 10/1971 | Scanlon |
| 3,614,929 A | 10/1971 | Herter et al. |
| 3,659,528 A | 5/1972 | Santala |
| 3,688,699 A | 9/1972 | Horn et al. |
| 3,690,256 A | 9/1972 | Schnitzer |
| 3,745,924 A | 7/1973 | Scanlon |
| 3,749,021 A | 7/1973 | Burgess |
| 3,756,156 A | 9/1973 | Schuster |
| 3,765,297 A | 10/1973 | Skochko et al. |
| 3,768,413 A | 10/1973 | Ramsay |
| 3,797,396 A | 3/1974 | Reed |
| 3,842,739 A | 10/1974 | Scanlon et al. |
| 3,866,536 A | 2/1975 | Greenberg |
| 3,874,294 A | 4/1975 | Hale |
| 3,955,506 A | 5/1976 | Luther et al. |
| 3,977,326 A | 8/1976 | Anderson et al. |
| 3,990,366 A | 11/1976 | Scanlon |
| 4,005,630 A | 2/1977 | Patrick |
| 4,020,763 A | 5/1977 | Iruretagoyena |
| 4,132,173 A | 1/1979 | Amuchastegui |

(56) References Cited

U.S. PATENT DOCUMENTS

| | | |
|---|---|---|
| 4,147,107 A | 4/1979 | Ringdal |
| 4,157,684 A | 6/1979 | Clausser |
| 4,173,186 A | 11/1979 | Dunham |
| 4,179,992 A | 12/1979 | Ramnarace et al. |
| 4,187,271 A | 2/1980 | Rolston et al. |
| 4,228,724 A | 10/1980 | Leich |
| 4,276,830 A | 7/1981 | Alice |
| 4,353,304 A | 10/1982 | Hubsch et al. |
| 4,475,435 A | 10/1984 | Mantel |
| 4,483,251 A | 11/1984 | Spalding |
| 4,598,445 A | 7/1986 | O'Connor |
| 4,614,157 A | 9/1986 | Grelle et al. |
| 4,679,505 A | 7/1987 | Reed |
| 4,718,348 A | 1/1988 | Ferrigno |
| 4,719,859 A | 1/1988 | Ballreich et al. |
| 4,726,296 A | 2/1988 | Leshner et al. |
| 4,763,576 A | 8/1988 | Kass et al. |
| 4,867,065 A | 9/1989 | Kaltmann et al. |
| 4,970,959 A | 11/1990 | Bilsbury et al. |
| 5,021,206 A | 6/1991 | Stoops |
| 5,033,386 A | 7/1991 | Vatsvog |
| 5,063,853 A | 11/1991 | Bilgeri |
| 5,090,327 A | 2/1992 | Bilgeri |
| 5,151,555 A | 9/1992 | Vatsvog |
| 5,165,040 A | 11/1992 | Andersson et al. |
| 5,237,930 A | 8/1993 | Belanger et al. |
| 5,247,888 A | 9/1993 | Conil |
| 5,259,288 A | 11/1993 | Vatsvog |
| 5,265,540 A | 11/1993 | Ducros et al. |
| D345,676 S | 4/1994 | Biffle |
| 5,433,148 A | 7/1995 | Barratault et al. |
| 5,535,495 A | 7/1996 | Gutowski |
| 5,563,365 A | 10/1996 | Dineen et al. |
| 5,616,642 A | 4/1997 | West et al. |
| D380,650 S | 7/1997 | Norris |
| 5,679,920 A | 10/1997 | Hallis et al. |
| 5,758,445 A | 6/1998 | Casull |
| 5,770,815 A | 6/1998 | Watson |
| 5,798,478 A | 8/1998 | Beal |
| 5,950,063 A | 9/1999 | Hens et al. |
| 5,961,200 A | 10/1999 | Friis |
| 5,969,288 A | 10/1999 | Baud |
| 5,979,331 A | 11/1999 | Casull |
| 6,004,682 A | 12/1999 | Rackovan et al. |
| 6,048,379 A | 4/2000 | Bray et al. |
| 6,070,532 A | 6/2000 | Halverson |
| D435,626 S | 12/2000 | Benini |
| 6,257,148 B1 | 7/2001 | Toivonen et al. |
| 6,257,149 B1 | 7/2001 | Cesaroni |
| D447,209 S | 8/2001 | Benini |
| 6,272,993 B1 | 8/2001 | Cook et al. |
| 6,283,035 B1 | 9/2001 | Olson et al. |
| 6,357,357 B1 | 3/2002 | Glasser |
| D455,052 S | 4/2002 | Gullickson et al. |
| D455,320 S | 4/2002 | Edelstein |
| 6,375,971 B1 | 4/2002 | Hansen |
| 6,408,764 B1 | 6/2002 | Heitmann et al. |
| 6,450,099 B1 | 9/2002 | Desgland |
| 6,460,464 B1 | 10/2002 | Attarwala |
| 6,523,476 B1 | 2/2003 | Riess et al. |
| 6,644,204 B2 | 11/2003 | Pierrot et al. |
| 6,649,095 B2 | 11/2003 | Buja |
| 6,672,219 B2 | 1/2004 | Mackerell et al. |
| 6,708,621 B1 | 3/2004 | Forichon-Chaumet et al. |
| 6,752,084 B1 | 6/2004 | Husseini et al. |
| 6,796,243 B2 | 9/2004 | Schmees et al. |
| 6,810,816 B2 | 11/2004 | Rennard |
| 6,840,149 B2 | 1/2005 | Beal |
| 6,845,716 B2 | 1/2005 | Husseini et al. |
| 7,000,547 B2 | 2/2006 | Amick |
| 7,014,284 B2 | 3/2006 | Morton et al. |
| 7,032,492 B2 | 4/2006 | Meshirer |
| 7,056,091 B2 | 6/2006 | Powers |
| 7,059,234 B2 | 6/2006 | Husseini |
| 7,159,519 B2 | 1/2007 | Robinson et al. |
| 7,165,496 B2 | 1/2007 | Reynolds |
| D540,710 S | 4/2007 | Charrin |
| 7,204,191 B2 | 4/2007 | Wiley et al. |
| 7,213,519 B2 | 5/2007 | Wiley et al. |
| 7,231,519 B2 | 6/2007 | Joseph et al. |
| 7,232,473 B2 | 6/2007 | Elliott |
| 7,299,750 B2 | 11/2007 | Schikora et al. |
| 7,353,756 B2 | 4/2008 | Leasure |
| 7,380,505 B1 | 6/2008 | Shiery |
| 7,383,776 B2 | 6/2008 | Amick |
| 7,392,746 B2 | 7/2008 | Hansen |
| 7,426,888 B2 | 9/2008 | Hunt |
| 7,441,504 B2 | 10/2008 | Husseini et al. |
| D583,927 S | 12/2008 | Benner |
| 7,458,322 B2 | 12/2008 | Reynolds et al. |
| 7,461,597 B2 | 12/2008 | Brunn |
| 7,568,417 B1 | 8/2009 | Lee |
| 7,585,166 B2 | 9/2009 | Buja |
| 7,610,858 B2 | 11/2009 | Chung |
| 7,750,091 B2 | 7/2010 | Maljkovic et al. |
| D626,619 S | 11/2010 | Gogol et al. |
| 7,841,279 B2 | 11/2010 | Reynolds et al. |
| D631,699 S | 2/2011 | Moreau |
| D633,166 S | 2/2011 | Richardson et al. |
| 7,908,972 B2 | 3/2011 | Brunn |
| 7,930,977 B2 | 4/2011 | Klein |
| 8,007,370 B2 | 8/2011 | Hirsch et al. |
| 8,056,232 B2 | 11/2011 | Patel et al. |
| 8,156,870 B2 | 4/2012 | South |
| 8,186,273 B2 | 5/2012 | Trivette |
| 8,191,480 B2 | 6/2012 | Mcaninch |
| 8,201,867 B2 | 6/2012 | Thomeczek |
| 8,206,522 B2 | 6/2012 | Sandstrom et al. |
| 8,220,393 B2 | 7/2012 | Schluckebier et al. |
| 8,240,252 B2 | 8/2012 | Maljkovic et al. |
| D675,882 S | 2/2013 | Crockett |
| 8,393,273 B2 | 3/2013 | Weeks et al. |
| 8,408,137 B2 | 4/2013 | Battaglia |
| D683,419 S | 5/2013 | Rebar |
| 8,443,729 B2 | 5/2013 | Mittelstaedt |
| 8,443,730 B2 | 5/2013 | Padgett |
| 8,464,641 B2 | 6/2013 | Se-Hong |
| 8,511,233 B2 | 8/2013 | Nilsson |
| D689,975 S | 9/2013 | Carlson et al. |
| 8,522,684 B2 | 9/2013 | Davies et al. |
| 8,540,828 B2 | 9/2013 | Busky et al. |
| 8,561,543 B2 | 10/2013 | Burrow |
| 8,573,126 B2 | 11/2013 | Klein et al. |
| 8,641,842 B2 | 2/2014 | Hafner et al. |
| 8,689,696 B1 | 4/2014 | Seeman et al. |
| 8,763,535 B2 | 7/2014 | Padgett |
| 8,790,455 B2 | 7/2014 | Borissov et al. |
| 8,807,008 B2 | 8/2014 | Padgett et al. |
| 8,807,040 B2 | 8/2014 | Menefee, III |
| 8,813,650 B2 | 8/2014 | Maljkovic et al. |
| D715,888 S | 10/2014 | Padgett |
| 8,850,985 B2 | 10/2014 | Maljkovic et al. |
| 8,857,343 B2 | 10/2014 | Marx |
| 8,869,702 B2 | 10/2014 | Padgett |
| D717,909 S | 11/2014 | Thrift et al. |
| 8,875,633 B2 | 11/2014 | Padgett |
| 8,893,621 B1 | 11/2014 | Escobar |
| 8,915,191 B2 | 12/2014 | Jones |
| 8,978,559 B2 | 3/2015 | Davies et al. |
| 8,985,023 B2 | 3/2015 | Mason |
| 9,003,973 B1 | 4/2015 | Padgett |
| 9,032,855 B1 | 5/2015 | Foren et al. |
| 9,091,516 B2 | 7/2015 | Davies et al. |
| 9,103,641 B2 | 8/2015 | Nielson et al. |
| 9,111,177 B2 | 8/2015 | Tateno et al. |
| 9,157,709 B2 | 10/2015 | Nuetzman et al. |
| 9,170,080 B2 | 10/2015 | Poore et al. |
| 9,182,204 B2 | 11/2015 | Maljkovic et al. |
| 9,188,412 B2 | 11/2015 | Maljkovic et al. |
| 9,200,157 B2 | 12/2015 | El-Hibri et al. |
| 9,200,878 B2 | 12/2015 | Seecamp |
| 9,200,880 B1 | 12/2015 | Foren et al. |
| 9,212,876 B1 | 12/2015 | Kostka et al. |
| 9,212,879 B2 | 12/2015 | Whitworth |

(56) References Cited

U.S. PATENT DOCUMENTS

| | | |
|---|---|---|
| 9,213,175 B2 | 12/2015 | Arnold |
| 9,254,503 B2 | 2/2016 | Ward |
| 9,255,775 B1 | 2/2016 | Rubin |
| D752,397 S | 3/2016 | Seiders et al. |
| 9,273,941 B2 | 3/2016 | Carlson et al. |
| D754,223 S | 4/2016 | Pederson et al. |
| 9,329,004 B2 | 5/2016 | Pace |
| 9,335,137 B2 | 5/2016 | Maljkovic et al. |
| 9,337,278 B1 | 5/2016 | Gu et al. |
| 9,347,457 B2 | 5/2016 | Ahrens et al. |
| 9,366,512 B2 | 6/2016 | Burczynski et al. |
| 9,372,054 B2 | 6/2016 | Padgett |
| 9,377,278 B2 | 6/2016 | Rubin |
| 9,389,052 B2 | 7/2016 | Conroy et al. |
| 9,395,165 B2 | 7/2016 | Maljkovic et al. |
| D764,624 S | 8/2016 | Masinelli |
| D765,214 S | 8/2016 | Padgett |
| 9,429,407 B2 | 8/2016 | Burrow |
| 9,441,930 B2 | 9/2016 | Burrow |
| 9,453,714 B2 | 9/2016 | Bosarge et al. |
| D773,009 S | 11/2016 | Bowers |
| 9,500,453 B2 | 11/2016 | Schluckebier et al. |
| 9,506,735 B1 | 11/2016 | Burrow |
| D774,824 S | 12/2016 | Gallagher |
| 9,513,092 B2 | 12/2016 | Emary |
| 9,513,096 B2 | 12/2016 | Burrow |
| 9,518,810 B1 | 12/2016 | Burrow |
| 9,523,563 B1 | 12/2016 | Burrow |
| 9,528,799 B2 | 12/2016 | Maljkovic |
| 9,546,849 B2 | 1/2017 | Burrow |
| 9,551,557 B1 | 1/2017 | Burrow |
| D778,391 S | 2/2017 | Burrow |
| D778,393 S | 2/2017 | Burrow |
| D778,394 S | 2/2017 | Burrow |
| D778,395 S | 2/2017 | Burrow |
| D779,021 S | 2/2017 | Burrow |
| D779,024 S | 2/2017 | Burrow |
| D780,283 S | 2/2017 | Burrow |
| 9,587,918 B1 | 3/2017 | Burrow |
| 9,599,443 B2 | 3/2017 | Padgett et al. |
| 9,625,241 B2 | 4/2017 | Neugebauer |
| 9,631,907 B2 | 4/2017 | Burrow |
| 9,644,930 B1 | 5/2017 | Burrow |
| 9,658,042 B2 | 5/2017 | Emary |
| 9,683,818 B2 | 6/2017 | Lemke et al. |
| D792,200 S | 7/2017 | Baiz et al. |
| 9,709,368 B2 | 7/2017 | Mahnke |
| D797,880 S | 9/2017 | Seecamp |
| 9,759,554 B2 | 9/2017 | Ng et al. |
| D800,244 S | 10/2017 | Burczynski et al. |
| D800,245 S | 10/2017 | Burczynski et al. |
| D800,246 S | 10/2017 | Burczynski et al. |
| 9,784,667 B2 | 10/2017 | Lukay et al. |
| 9,835,423 B2 | 12/2017 | Burrow |
| 9,835,427 B2 | 12/2017 | Burrow |
| 9,857,151 B2 | 1/2018 | Dionne et al. |
| 9,869,536 B2 | 1/2018 | Burrow |
| 9,879,954 B2 | 1/2018 | Hajjar |
| 9,885,551 B2 | 2/2018 | Burrow |
| D813,975 S | 3/2018 | White |
| 9,921,040 B2 | 3/2018 | Rubin |
| 9,927,219 B2 | 3/2018 | Burrow |
| 9,933,241 B2 | 4/2018 | Burrow |
| 9,939,236 B2 | 4/2018 | Drobockyi et al. |
| 9,964,388 B1 | 5/2018 | Burrow |
| 9,976,840 B1 * | 5/2018 | Burrow ............... F42B 5/30 |
| D821,536 S | 6/2018 | Christiansen et al. |
| 9,989,339 B2 | 6/2018 | Riess |
| 9,989,343 B2 | 6/2018 | Padgett et al. |
| 10,041,770 B2 | 8/2018 | Burrow |
| 10,041,771 B1 | 8/2018 | Burrow |
| 10,041,776 B1 | 8/2018 | Burrow |
| 10,041,777 B1 | 8/2018 | Burrow |
| 10,048,049 B2 | 8/2018 | Burrow |
| 10,048,050 B1 | 8/2018 | Burrow |
| 10,048,052 B2 | 8/2018 | Burrow |
| 10,054,413 B1 | 8/2018 | Burrow |
| D828,483 S | 9/2018 | Burrow |
| 10,081,057 B2 | 9/2018 | Burrow |
| D832,037 S | 10/2018 | Gallagher |
| 10,101,136 B2 * | 10/2018 | Burrow ............... F42B 5/30 |
| 10,101,140 B2 | 10/2018 | Burrow |
| 10,124,343 B2 | 11/2018 | Tsai |
| 10,145,662 B2 | 12/2018 | Burrow |
| 10,190,857 B2 | 1/2019 | Burrow |
| 10,234,249 B2 | 3/2019 | Burrow |
| 10,234,253 B2 | 3/2019 | Burrow |
| 10,240,905 B2 | 3/2019 | Burrow |
| 10,254,096 B2 | 4/2019 | Burrow |
| 10,260,847 B2 | 4/2019 | Viggiano et al. |
| 10,274,293 B2 * | 4/2019 | Burrow ............... F42B 5/30 |
| D849,181 S | 5/2019 | Burrow |
| 10,302,403 B2 | 5/2019 | Burrow |
| 10,302,404 B2 | 5/2019 | Burrow |
| 10,323,918 B2 | 6/2019 | Menefee, III |
| 10,330,451 B2 | 6/2019 | Burrow |
| 10,345,088 B2 | 7/2019 | Burrow |
| 10,352,664 B2 | 7/2019 | Burrow |
| 10,352,670 B2 | 7/2019 | Burrow |
| 10,359,262 B2 | 7/2019 | Burrow |
| 10,365,074 B2 | 7/2019 | Burrow |
| D861,118 S | 9/2019 | Burrow |
| D861,119 S | 9/2019 | Burrow |
| 10,408,582 B2 | 9/2019 | Burrow |
| 10,408,592 B2 | 9/2019 | Boss et al. |
| 10,415,943 B2 | 9/2019 | Burrow |
| 10,429,156 B2 | 10/2019 | Burrow |
| 10,458,762 B2 | 10/2019 | Burrow |
| 10,466,020 B2 | 11/2019 | Burrow |
| 10,466,021 B2 | 11/2019 | Burrow |
| 10,480,911 B2 | 11/2019 | Burrow |
| 10,480,912 B2 | 11/2019 | Burrow |
| 10,480,915 B2 | 11/2019 | Burrow et al. |
| 10,488,165 B2 | 11/2019 | Burrow |
| 10,533,830 B2 | 1/2020 | Burrow et al. |
| 10,571,228 B2 | 2/2020 | Burrow |
| 10,571,229 B2 | 2/2020 | Burrow |
| 10,571,230 B2 | 2/2020 | Burrow |
| 10,571,231 B2 | 2/2020 | Burrow |
| 10,578,409 B2 | 3/2020 | Burrow |
| 10,591,260 B2 | 3/2020 | Burrow et al. |
| D882,019 S | 4/2020 | Burrow et al. |
| D882,020 S | 4/2020 | Burrow et al. |
| D882,021 S | 4/2020 | Burrow et al. |
| D882,022 S | 4/2020 | Burrow et al. |
| D882,023 S | 4/2020 | Burrow et al. |
| D882,024 S | 4/2020 | Burrow et al. |
| D882,025 S | 4/2020 | Burrow et al. |
| D882,026 S | 4/2020 | Burrow et al. |
| D882,027 S | 4/2020 | Burrow et al. |
| D882,028 S | 4/2020 | Burrow et al. |
| D882,029 S | 4/2020 | Burrow et al. |
| D882,030 S | 4/2020 | Burrow et al. |
| D882,031 S | 4/2020 | Burrow et al. |
| D882,032 S | 4/2020 | Burrow et al. |
| D882,033 S | 4/2020 | Burrow et al. |
| D882,720 S | 4/2020 | Burrow et al. |
| D882,721 S | 4/2020 | Burrow et al. |
| D882,722 S | 4/2020 | Burrow et al. |
| D882,723 S | 4/2020 | Burrow et al. |
| D882,724 S | 4/2020 | Burrow et al. |
| 10,612,896 B2 | 4/2020 | Burrow |
| 10,612,897 B2 | 4/2020 | Burrow et al. |
| D884,115 S | 5/2020 | Burrow et al. |
| 10,663,271 B2 | 5/2020 | Rogers |
| D886,231 S | 6/2020 | Burrow et al. |
| D886,937 S | 6/2020 | Burrow et al. |
| 10,677,573 B2 * | 6/2020 | Burrow ............... F42B 5/307 |
| D891,567 S | 7/2020 | Burrow et al. |
| D891,568 S | 7/2020 | Burrow et al. |
| D891,569 S | 7/2020 | Burrow et al. |
| D891,570 S | 7/2020 | Burrow et al. |
| 10,704,869 B2 | 7/2020 | Burrow et al. |
| 10,704,870 B2 | 7/2020 | Burrow et al. |

(56) References Cited

U.S. PATENT DOCUMENTS

| | | |
|---|---|---|
| 10,704,871 B2 | 7/2020 | Burrow et al. |
| 10,704,872 B1 | 7/2020 | Burrow et al. |
| 10,704,876 B2 | 7/2020 | Boss et al. |
| 10,704,877 B2 | 7/2020 | Boss et al. |
| 10,704,878 B2 | 7/2020 | Boss et al. |
| 10,704,879 B1 | 7/2020 | Burrow et al. |
| 10,704,880 B1 | 7/2020 | Burrow et al. |
| D892,258 S | 8/2020 | Burrow et al. |
| D893,665 S | 8/2020 | Burrow et al. |
| D893,666 S | 8/2020 | Burrow et al. |
| D893,667 S | 8/2020 | Burrow et al. |
| D893,668 S | 8/2020 | Burrow et al. |
| D894,320 S | 8/2020 | Burrow et al. |
| 10,731,956 B2 | 8/2020 | Burrow et al. |
| 10,731,957 B1 | 8/2020 | Burrow et al. |
| 10,753,713 B2 | 8/2020 | Burrow |
| 10,760,882 B1 | 9/2020 | Burrow |
| 2003/0127011 A1 | 7/2003 | Mackerell et al. |
| 2004/0074412 A1 | 4/2004 | Kightlinger |
| 2004/0200340 A1 | 10/2004 | Robinson et al. |
| 2005/0056183 A1 | 3/2005 | Meshirer |
| 2005/0081704 A1 | 4/2005 | Husseini |
| 2005/0257712 A1 | 11/2005 | Husseini et al. |
| 2006/0027125 A1 | 2/2006 | Brunn |
| 2006/0278116 A1 | 12/2006 | Hunt |
| 2006/0283345 A1 | 12/2006 | Feldman et al. |
| 2007/0056343 A1 | 3/2007 | Cremonesi |
| 2007/0181029 A1 | 8/2007 | Mcaninch |
| 2007/0214992 A1 | 9/2007 | Dittrich |
| 2007/0214993 A1 | 9/2007 | Cerovic et al. |
| 2007/0267587 A1 | 11/2007 | Dalluge |
| 2010/0101444 A1 | 4/2010 | Schluckebier et al. |
| 2010/0212533 A1 | 8/2010 | Brunn |
| 2010/0234132 A1 | 9/2010 | Hirsch et al. |
| 2010/0258023 A1 | 10/2010 | Reynolds et al. |
| 2010/0282112 A1 | 11/2010 | Battaglia |
| 2011/0179965 A1 | 7/2011 | Mason |
| 2012/0024183 A1 | 2/2012 | Klein |
| 2012/0111219 A1 | 5/2012 | Burrow |
| 2012/0180685 A1 | 7/2012 | Se-Hong |
| 2012/0180687 A1 | 7/2012 | Padgett et al. |
| 2012/0291655 A1 | 11/2012 | Jones |
| 2013/0008335 A1 | 1/2013 | Menefee |
| 2013/0014664 A1 | 1/2013 | Padgett |
| 2013/0076865 A1 | 3/2013 | Tateno et al. |
| 2013/0186294 A1 | 7/2013 | Davies et al. |
| 2013/0291711 A1 | 11/2013 | Mason |
| 2014/0224144 A1 | 8/2014 | Neugebauer |
| 2014/0260925 A1 | 9/2014 | Beach et al. |
| 2014/0261044 A1 | 9/2014 | Seecamp |
| 2014/0311332 A1 | 10/2014 | Carlson et al. |
| 2015/0075400 A1 | 3/2015 | Lemke et al. |
| 2015/0226220 A1 | 8/2015 | Bevington |
| 2015/0268020 A1 | 9/2015 | Emary |
| 2016/0003585 A1 | 1/2016 | Carpenter et al. |
| 2016/0003589 A1 | 1/2016 | Burrow |
| 2016/0003590 A1 | 1/2016 | Burrow |
| 2016/0003593 A1 | 1/2016 | Burrow |
| 2016/0003594 A1 | 1/2016 | Burrow |
| 2016/0003595 A1 | 1/2016 | Burrow |
| 2016/0003596 A1 | 1/2016 | Burrow |
| 2016/0003597 A1 | 1/2016 | Burrow |
| 2016/0003601 A1 | 1/2016 | Burrow |
| 2016/0033241 A1 | 2/2016 | Burrow |
| 2016/0102030 A1 | 4/2016 | Coffey et al. |
| 2016/0146585 A1 | 5/2016 | Padgett |
| 2016/0245626 A1 | 8/2016 | Drieling et al. |
| 2016/0265886 A1 | 9/2016 | Aldrich et al. |
| 2016/0349022 A1 | 12/2016 | Burrow |
| 2016/0349023 A1 | 12/2016 | Burrow |
| 2016/0349028 A1 | 12/2016 | Burrow |
| 2016/0356588 A1 | 12/2016 | Burrow |
| 2016/0377399 A1 | 12/2016 | Burrow |
| 2017/0030690 A1 | 2/2017 | Viggiano et al. |
| 2017/0030692 A1 | 2/2017 | Drobockyi et al. |
| 2017/0080498 A1 | 3/2017 | Burrow |
| 2017/0082409 A1 | 3/2017 | Burrow |
| 2017/0082411 A1 | 3/2017 | Burrow |
| 2017/0089673 A1 | 3/2017 | Burrow |
| 2017/0089674 A1 | 3/2017 | Burrow |
| 2017/0089675 A1 | 3/2017 | Burrow |
| 2017/0089679 A1 | 3/2017 | Burrow |
| 2017/0115105 A1 | 4/2017 | Burrow |
| 2017/0153093 A9 | 6/2017 | Burrow |
| 2017/0153099 A9 | 6/2017 | Burrow |
| 2017/0191812 A1 | 7/2017 | Padgett et al. |
| 2017/0199018 A9 | 7/2017 | Burrow |
| 2017/0205217 A9 | 7/2017 | Burrow |
| 2017/0261296 A1 | 9/2017 | Burrow |
| 2017/0299352 A9 | 10/2017 | Burrow |
| 2018/0066925 A1 | 3/2018 | Skowron et al. |
| 2018/0106581 A1 | 4/2018 | Rogers |
| 2018/0224252 A1 | 8/2018 | O'Rourke |
| 2018/0224253 A1 | 8/2018 | Burrow |
| 2018/0224256 A1 | 8/2018 | Burrow |
| 2018/0259310 A1 | 9/2018 | Burrow |
| 2018/0292186 A1 | 10/2018 | Padgett et al. |
| 2018/0306558 A1 | 10/2018 | Padgett et al. |
| 2019/0011233 A1 | 1/2019 | Boss et al. |
| 2019/0011234 A1 | 1/2019 | Boss et al. |
| 2019/0011235 A1 | 1/2019 | Boss et al. |
| 2019/0011236 A1 | 1/2019 | Burrow |
| 2019/0011237 A1 | 1/2019 | Burrow |
| 2019/0011238 A1 | 1/2019 | Burrow |
| 2019/0011239 A1 | 1/2019 | Burrow |
| 2019/0011240 A1 | 1/2019 | Burrow |
| 2019/0011241 A1 | 1/2019 | Burrow |
| 2019/0025019 A1 | 1/2019 | Burrow |
| 2019/0025020 A1 | 1/2019 | Burrow |
| 2019/0025021 A1 | 1/2019 | Burrow |
| 2019/0025022 A1 | 1/2019 | Burrow |
| 2019/0025023 A1 | 1/2019 | Burrow |
| 2019/0025024 A1 | 1/2019 | Burrow |
| 2019/0025025 A1 | 1/2019 | Burrow |
| 2019/0025026 A1 | 1/2019 | Burrow |
| 2019/0025035 A1 | 1/2019 | Burrow |
| 2019/0078862 A1 | 3/2019 | Burrow |
| 2019/0106364 A1 | 4/2019 | James |
| 2019/0107375 A1 | 4/2019 | Burrow |
| 2019/0137228 A1 | 5/2019 | Burrow et al. |
| 2019/0137229 A1 | 5/2019 | Burrow et al. |
| 2019/0137230 A1 | 5/2019 | Burrow et al. |
| 2019/0137231 A1 | 5/2019 | Burrow et al. |
| 2019/0137233 A1 | 5/2019 | Burrow et al. |
| 2019/0137234 A1 | 5/2019 | Burrow et al. |
| 2019/0137235 A1 | 5/2019 | Burrow et al. |
| 2019/0137236 A1 | 5/2019 | Burrow et al. |
| 2019/0137237 A1 | 5/2019 | Burrow et al. |
| 2019/0137238 A1 | 5/2019 | Burrow et al. |
| 2019/0137239 A1 | 5/2019 | Burrow et al. |
| 2019/0137240 A1 | 5/2019 | Burrow et al. |
| 2019/0137241 A1 | 5/2019 | Burrow et al. |
| 2019/0137242 A1 | 5/2019 | Burrow et al. |
| 2019/0137243 A1 | 5/2019 | Burrow et al. |
| 2019/0137244 A1 | 5/2019 | Burrow et al. |
| 2019/0170488 A1 | 6/2019 | Burrow |
| 2019/0204050 A1 | 7/2019 | Burrow |
| 2019/0204056 A1 | 7/2019 | Burrow |
| 2019/0212117 A1 | 7/2019 | Burrow |
| 2019/0242679 A1 | 8/2019 | Viggiano et al. |
| 2019/0242682 A1 | 8/2019 | Burrow |
| 2019/0242683 A1 | 8/2019 | Burrow |
| 2019/0249967 A1 | 8/2019 | Burrow et al. |
| 2019/0257625 A1 | 8/2019 | Burrow |
| 2019/0310058 A1 | 10/2019 | Burrow |
| 2019/0310059 A1 | 10/2019 | Burrow |
| 2019/0316886 A1 | 10/2019 | Burrow |
| 2019/0360788 A1 | 11/2019 | Burrow |
| 2019/0376773 A1 | 12/2019 | Burrow |
| 2019/0376774 A1 | 12/2019 | Boss et al. |
| 2019/0383590 A1 | 12/2019 | Burrow |
| 2020/0011645 A1 | 1/2020 | Burrow et al. |
| 2020/0011646 A1 | 1/2020 | Burrow et al. |
| 2020/0025536 A1 | 1/2020 | Burrow et al. |

(56) References Cited

U.S. PATENT DOCUMENTS

| | | |
|---|---|---|
| 2020/0025537 A1 | 1/2020 | Burrow et al. |
| 2020/0033102 A1 | 1/2020 | Burrow |
| 2020/0033103 A1 | 1/2020 | Burrow et al. |
| 2020/0041239 A1 | 2/2020 | Burrow |
| 2020/0049469 A1 | 2/2020 | Burrow |
| 2020/0049470 A1 | 2/2020 | Burrow |
| 2020/0049471 A1 | 2/2020 | Burrow |
| 2020/0049472 A1 | 2/2020 | Burrow |
| 2020/0049473 A1 | 2/2020 | Burrow |
| 2020/0056872 A1 | 2/2020 | Burrow |
| 2020/0109932 A1 | 4/2020 | Burrow |
| 2020/0149853 A1 | 5/2020 | Burrow |
| 2020/0158483 A1 | 5/2020 | Burrow |
| 2020/0200512 A1 | 6/2020 | Burrow |
| 2020/0200513 A1 | 6/2020 | Burrow |
| 2020/0208948 A1 | 7/2020 | Burrow |
| 2020/0208949 A1 | 7/2020 | Burrow |
| 2020/0225009 A1 | 7/2020 | Burrow |
| 2020/0248998 A1 | 8/2020 | Burrow |
| 2020/0248999 A1 | 8/2020 | Burrow |
| 2020/0249000 A1 | 8/2020 | Burrow |
| 2020/0256654 A1 | 8/2020 | Burrow |
| 2020/0263967 A1 | 8/2020 | Burrow et al. |
| 2020/0278183 A1 | 9/2020 | Burrow et al. |
| 2020/0292283 A1 | 9/2020 | Burrow |
| 2020/0300587 A1 | 9/2020 | Burrow et al. |
| 2020/0300592 A1 | 9/2020 | Overton et al. |

FOREIGN PATENT DOCUMENTS

| | | |
|---|---|---|
| DE | 16742 C | 1/1882 |
| EP | 2625486 A4 | 8/2017 |
| FR | 1412414 A | 10/1965 |
| GB | 783023 A | 9/1957 |
| RU | 2172467 C1 | 8/2001 |
| WO | 0034732 | 6/2000 |
| WO | 2007014024 A2 | 2/2007 |
| WO | 2012047615 A1 | 4/2012 |
| WO | 2012097320 A1 | 7/2012 |
| WO | 2012097317 A3 | 11/2012 |
| WO | 2013070250 A1 | 5/2013 |
| WO | 2013096848 A1 | 6/2013 |
| WO | 2014062256 A2 | 4/2014 |
| WO | 2016003817 A1 | 1/2016 |
| WO | 2019094544 A1 | 5/2019 |
| WO | 2019160742 A2 | 8/2019 |

OTHER PUBLICATIONS

International Ammunition Association, Inc. website, published on Apr. 2017, PCP Ammo Variation in U.S. Military Polymer/Metal Cartridge Case R&D, Available on the Internet URL https://forum.cartridgecollectors.org/t/pcp-ammo-variation-in-u-s-military-polyer-metal-cartridge-case-r-d/24400.

International Search Report and Written Opinion for PCTUS201859748 dated Mar. 1, 2019, pp. 1-9.

International Search Report and Written Opinion for PCTUS2019017085 dated Apr. 19, 2019, pp. 1-9.

International Search Report and Written Opinion in PCT/US2019/040323 dated Sep. 24, 2019, pp. 1-16.

International Search Report and Written Opinion in PCT/US2019/040329 dated Sep. 27, 2019, pp. 1-24.

Korean Intellectual Property Office (ISA), International Search Report and Written Opinion for PCT/US2011/062781 dated Nov. 30, 2012, 16 pp.

Korean Intellectual Property Office (ISA), International Search Report and Written Opinion for PCT/US2015/038061 dated Sep. 21, 2015, 28 pages.

Luck Gunner.com, Review: Polymer Cased Rifle Ammunition from PCP Ammo, Published Jan. 6, 2014, Available on the Internet URL https://www.luckygunner.com/lounge/pcp-ammo-review.

YouTube.com—TFB TV, Published on Jul. 23, 2015, available on Internal URL https://www.youtubecom/watch?v=mCjNkbxHkEE.

International Preliminary Report on Patentability and Written Opinion in PCT/US2018/059748 dated May 12, 2020; pp. 1-8.

IPRP in PCT2019017085 dated Aug. 27, 2020, pp. 1-8.

* cited by examiner

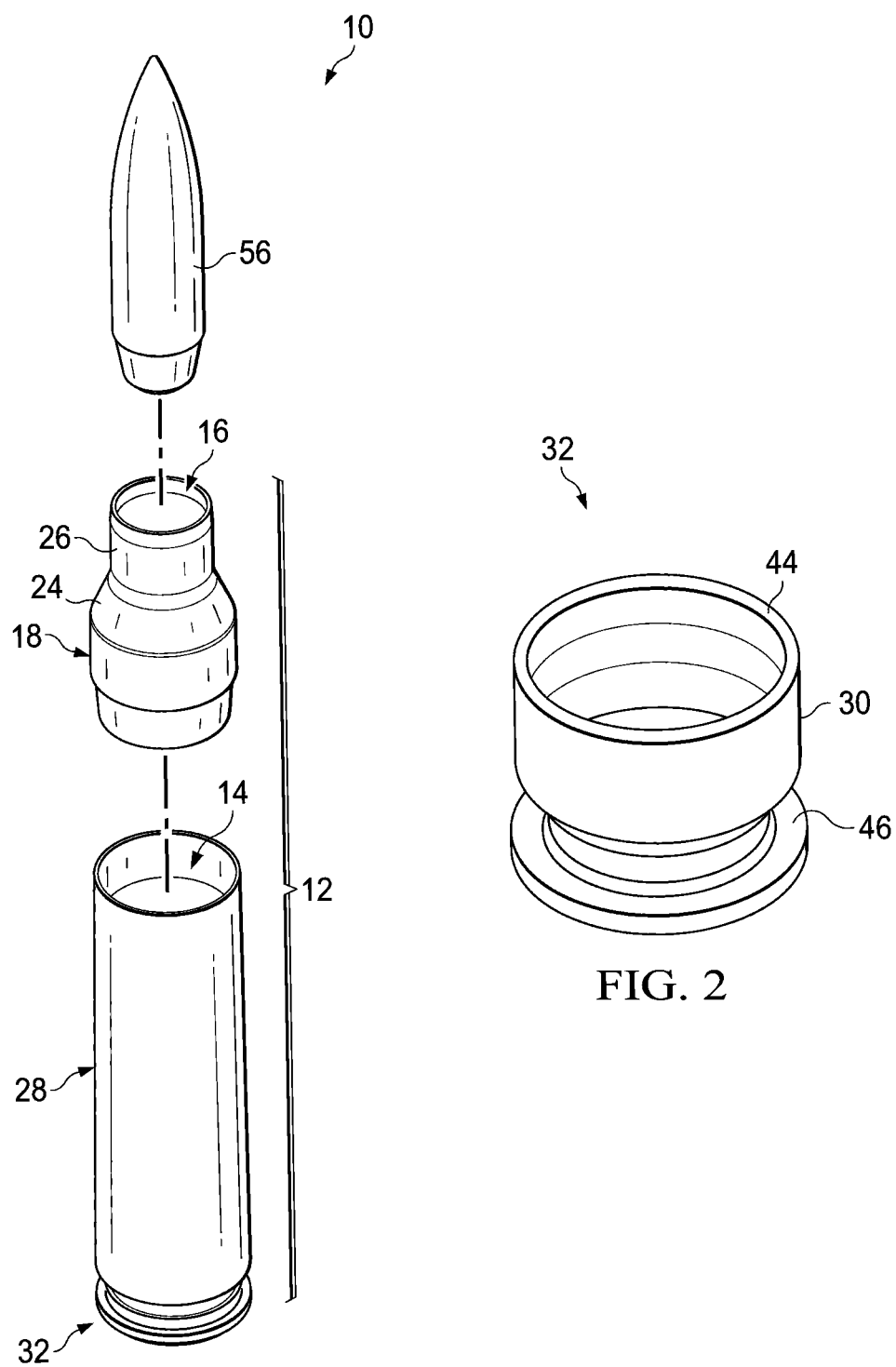

POLYMER AMMUNITION AND CARTRIDGE PRIMER INSERT

CROSS-REFERENCE TO RELATED APPLICATIONS

This application is a Continuation Application of co-pending U.S. patent application Ser. No. 16/111,715 file on Aug. 24, 2018, which is a Continuation Application of U.S. patent application Ser. No. 15/911,544 filed on Mar. 5, 2018 now U.S. Pat. No. 10,352,664 issued Jul. 16, 2019, which is a continuation of U.S. patent application Ser. No. 15,406,844 filed on Jan. 16, 2017 now U.S. Pat. No. 9,933,241 issued Apr. 3, 2018, which is a continuation of U.S. patent application Ser. No. 14/011,202 filed on Aug. 27, 2013 now U.S. Pat. No. 9,546,849 issued Jan. 17, 2017, which is a division of U.S. patent application Ser. No. 13/292,843 filed on Nov. 9, 2011 now U.S. Pat. No. 8,561,543 issued Oct. 13, 2013, which claims the benefit of U.S. Provisional Patent Application Ser. No. 61/456,664, filed Nov. 10, 2010, the contents of each are hereby incorporated by reference in their entirety.

TECHNICAL FIELD OF THE INVENTION

The present invention relates in general to the field of ammunition, specifically to compositions of matter and methods of making and using polymeric ammunition cartridge primer inserts.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with lightweight polymer cartridge casing ammunition. Conventional ammunition cartridge casings for rifles and machine guns, as well as larger caliber weapons, are made from brass, which is heavy, expensive, and potentially hazardous. There exists a need for an affordable lighter weight replacement for brass ammunition cartridge cases that can increase mission performance and operational capabilities. Lightweight polymer cartridge casing ammunition must meet the reliability and performance standards of existing fielded ammunition and be interchangeable with brass cartridge casing ammunition in existing weaponry. Reliable cartridge casings manufacture requires uniformity (e.g., bullet seating, bullet-to-casing fit, casing strength, etc.) from one cartridge to the next in order to obtain consistent pressures within the casing during firing prior to bullet and casing separation to create uniformed ballistic performance. Plastic cartridge casings have been known for many years but have failed to provide satisfactory ammunition that could be produced in commercial quantities with sufficient safety, ballistic, handling characteristics, and survive physical and natural conditions to which it will be exposed during the ammunition's intended life cycle; however, these characteristics have not been achieved.

For example, U.S. patent application Ser. No. 11/160,682 discloses a base for a cartridge casing body for an ammunition article, the base having an ignition device; an attachment device at one end thereof, the attachment device being adapted to the base to a cartridge casing body; wherein the base is made from plastic, ceramic, or a composite material.

U.S. Pat. No. 7,610,858 discloses an ammunition cartridge assembled from a substantially cylindrical polymeric cartridge casing body defining a casing headspace with an open projectile-end and an end opposing the projectile-end, wherein the casing body has a substantially cylindrical injection molded polymeric bullet-end component with opposing first and second ends, the first end of which is the projectile-end of the casing body and the second end has a male or female coupling element; and a cylindrical polymeric middle body component with opposing first and second ends, wherein the first end has a coupling element that is a mate for the projectile-end coupling element and joins the first end of the middle body component to the second end of the bullet-end component, and the second end is the end of the casing body opposite the projectile end and has a male or female coupling element; and a cylindrical cartridge casing head-end component with an essentially closed base end with a primer hole opposite an open end with a coupling element that is a mate for the coupling element on the second end of the middle body and joins the second end of the middle body component to the open end of the head-end component; wherein the middle body component is formed from a material more ductile than the material head-end component is formed from but equal or less ductile than the material the bullet-end component is formed from. Methods for assembling ammunition cartridges and ammunition cartridges having the headspace length larger than the corresponding headspace length of the chamber of the intended weapon measured at the same basic diameter for the cartridge casing without being so large as to jam the weapon or otherwise interfere with its action are also disclosed.

Shortcomings of the known methods of producing plastic or substantially plastic ammunition include the possibility of the projectile being pushed into the cartridge casing, the bullet pull being too light such that the bullet can fall out, the bullet pull being too insufficient to create sufficient chamber pressure, the bullet pull not being uniform from round to round, and portions of the cartridge casing breaking off upon firing causing the weapon to jam or damage or danger when subsequent rounds are fired or when the casing portions themselves become projectiles. To overcome the above shortcomings, improvements in cartridge case design and performance polymer materials are needed.

BRIEF SUMMARY OF THE INVENTION

One embodiment of the present invention provides a polymeric ammunition cartridge.

The present invention provides a primer insert for a polymer ammunition cartridge comprising: a top surface; a bottom surface opposite the top surface; a coupling element that extends from the bottom surface, wherein the coupling element comprises an interior surface and an exterior surface, wherein the interior surface comprises: a transition region that transitions from the bottom surface to a second segment wherein the transition region has a radius of from 0.1 to 0.2; a first segment extending from the second segment and terminates at a tip, wherein the first segment has a first segment distance from 0.06 to 0.14 inches and the second segment has a second segment distance from 0.05 to 0.15 inches, wherein the second segment has a second segment angle from +3 to −3 degrees relative to the first segment angle and the first segment has a first segment angle from +6 to −6 degrees from perpendicular to the top surface; a primer recess in the top surface that extends toward the bottom surface; a primer flash aperture positioned in the primer recess through the bottom surface; and a flash aperture groove in the primer recess and positioned around the primer flash aperture and adapted to receive a polymer overmolding through the primer flash aperture. The transition region comprises one or more straight segments, one or more curved segments or a combination of one or more straight segments and one or more curved segments. The first segment has a first segment distance is about 0.1 inches, the second segment has a second segment distance is about 0.1 inches and the transition region is concave with a radius of about 0.14, wherein the insert height is about 0.6 inches, is about 0.65 inches or about 0.75 inches. In addition, the second segment has a second segment angle is about 1 degrees and the first segment has a first segment is about 3 degrees or the second segment has a second segment angle is about 3 degrees and the first segment has a first segment is about 0 degrees. The first segment has a first segment distance is about 0.085 inches, the second segment has a second segment distance is about 0.12 inches and the transition region is concave with a radius of about 0.15, wherein the second segment has a second segment angle is about 1 degrees and the first segment has a first segment is about 3 degrees or the second segment has a second segment angle is about 3 degrees and the first segment has a first segment is about 0 degrees. In addition, the insert height is about 0.6 inches, is about 0.65 inches or about 0.75 inches. The primer insert of claim 1, wherein the first segment has a first segment distance is about 0.12 inches, the second segment has a second segment distance is about 0.085 inches and the transition region is concave with a radius of about 0.15. The second segment has a second segment angle is about 1 degrees and the first segment has a first segment is about 3 degrees. The second segment has a second segment angle is about 3 degrees and the first segment has a first segment is about 0 degrees. The primer insert further comprising an insert height that extends from the top surface to the tip, wherein the insert height is about 0.65 inches. The primer insert further comprising an insert height that extends from the top surface to the tip, wherein the insert height is about 0.75 inches. The first segment has a first segment distance is about 0.08 inches, the second segment has a second segment distance is about 0.1 inches and the transition region is concave with a radius of about 0.14.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which:

FIG. 1 depicts an exploded view of the polymeric cartridge casing;

FIG. 2 depicts an elevation view of one embodiment of the primer insert of the present invention;

DETAILED DESCRIPTION OF THE INVENTION

Figure 3:
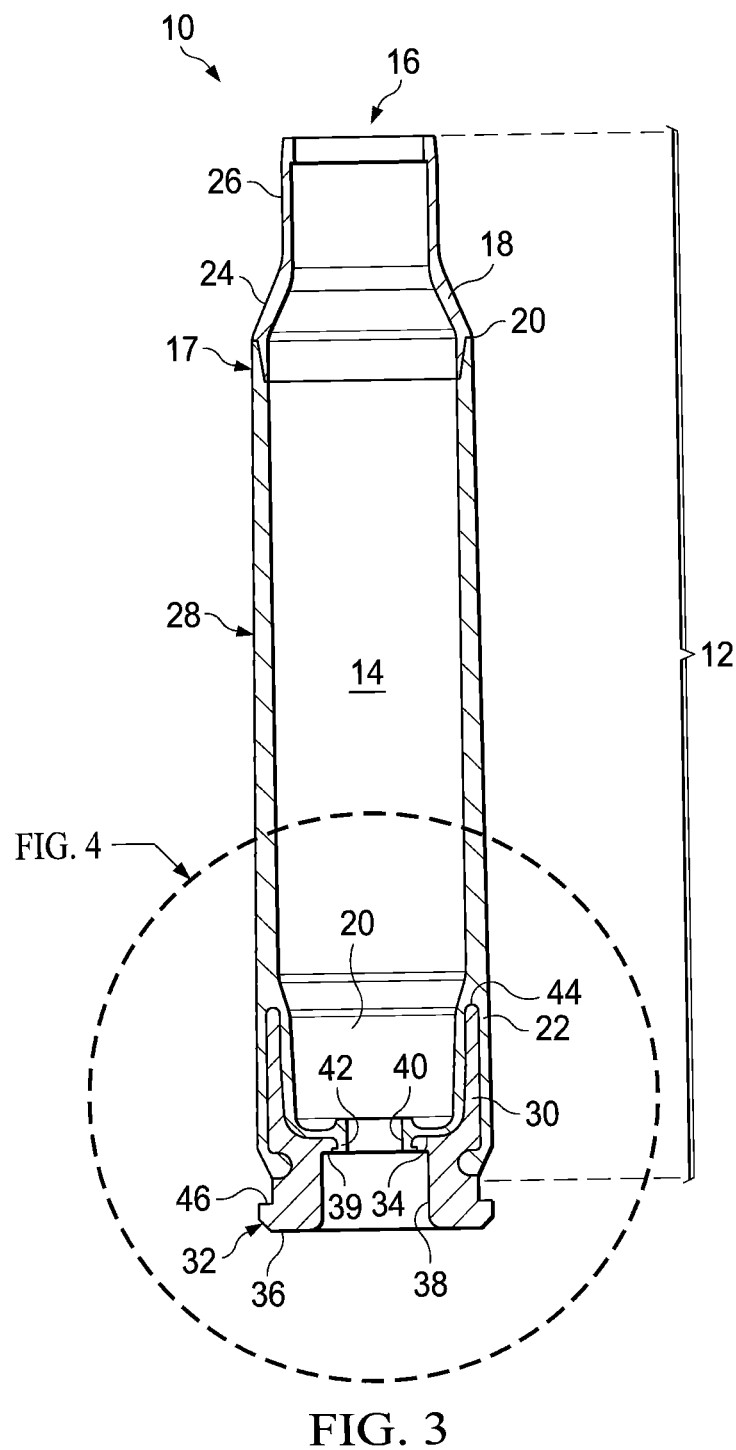
FIG. 3 depicts a side, cross-sectional view of a polymeric cartridge case according to one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Reliable cartridge manufacture requires uniformity from one cartridge to the next in order to obtain consistent ballistic performance. Among other considerations, proper bullet seating and bullet-to-casing fit is required. In this manner, a desired pressure develops within the casing during firing prior to bullet and casing separation. Historically, bullets employ a cannelure, which is a slight annular depression formed in a surface of the bullet at a location determined to be the optimal seating depth for the bullet. In this manner, a visual inspection of a cartridge could determine whether or not the bullet is seated at the proper depth. Once the bullet is inserted into the casing to the proper depth, one of two standard procedures is incorporated to lock the bullet in its proper location. One method is the crimping of the entire end of the casing into the cannelure. A second method does not crimp the casing end; rather the bullet is pressure fitted into the casing.

The polymeric ammunition cartridges of the present invention are of a caliber typically carried by soldiers in combat for use in their combat weapons. The present invention is not limited to the described caliber and is believed to be applicable to other calibers as well. This includes various small and medium caliber munitions, including 5.56 mm, 7.62 mm, 12.7 mm and .50 caliber ammunition cartridges, as well as medium/small caliber ammunition such as 380 caliber, 308 caliber, 38 caliber, 9 mm, 10 mm, 20 mm, 25 mm, 30 mm, 40 mm, 45 caliber and the like. The cartridges, therefore, are of a caliber between about 0.05 and about 5 inches. Thus, the present invention is also applicable to the sporting goods industry for use by hunters and target shooters.

FIG. 1 depicts an exploded view of the polymeric ammunition 10. A polymeric cartridge 12 suitable for use with high velocity rifles is shown manufactured with a polymeric middle body component 28 having a polymeric nose 18. The polymeric middle body component 28 includes an overmolded primer insert 32 and forms a propellant chamber 14. The insert 32 also includes a primer recess (not shown) formed therein for insertion of the primer (not shown). The polymeric nose 18 has a shoulder 24 connected to a chamber neck 26 terminating in a projectile aperture 16 which accepts a bullet 56 therein.

FIG. 2 depicts an elevation view of one embodiment of the primer insert 32 of the present invention. The primer insert 32 includes a coupling element 30 extending from a bottom surface (not shown) and tapers to a smaller diameter at the tip 44. When the primer insert 32 is overmolded with the middle body component (not shown) over the substantially cylindrical coupling element 30 and the tip 44 to form a physical interlock between primer insert 32 and middle body component (not shown). The primer insert 32 also has a flange 46 at one end and a primer recess (not shown) formed therein for insertion of a primer (not shown).

FIG. 3 depicts a side, cross-sectional view of a polymeric cartridge case according to one embodiment of the present invention. The ammunition cartridge 10 includes a polymer cartridge 12 overmolding a primer insert 32, a polymeric nose 18, a propellant/powder chamber 14 and a projectile aperture 16. The polymeric nose 18 extending from projectile aperture 16 toward the nose joint 20 which are separated by a neck 26 and a shoulder 24. The nose joint 20 may be configured in various designs that allow the joining of the polymeric nose 18 to the middle body component 28. For example, the joint 20 may be a butt joint, a bevel lap splice joint, a half lap joint, a lap joint, a square joint, a single bevel joint, double bevel joint, single J joint, double J joint, single v joint, double v joint, single U joint, double U joint, flange joint, tee joint, flare joint, edge joint, rabbit joint, dado and any other joint. In addition, the joint type may be modified to allow a gap at regions in the joint. For example, a dado joint may be formed where the fit is not square allowing gaps to form at the corner of the dado. Similarly, a compound joint may be used, e.g., rabbit joint transitioning to a butt joint transitioning to a bevel joint (modified to have a gap in the fit) transitioning to a butt joint and ending in a lap joint or rabbit joint. In addition the angle of the joint need not be at 90 and 180 degrees. The joint angle may be at any angle from 0-180 degrees and may vary along the joint. For instance the joint may start at a 0 degree move to a +45 degree angle transition to a −40 degree angle and conclude by tapering at a 10 degree angle. The polymeric nose 18 typically has a wall thickness between about 0.003 and about 0.200 inches and preferably between about 0.005 and more preferably between about 0.150 inches about 0.010 and about 0.050 inches.

The middle body component 28 is formed by molding a case joint 19 at one end and overmolding the primer insert 32 at the other. A coupling element 30 extending from a bottom surface 34 that is opposite a top surface 36. The middle body component 28 overmolds the coupling element 30 of the insert 32. The coupling element 30, as shown, is configured as a male element, however, all combinations of male and female configurations are acceptable for coupling elements 30. Located in the top surface 36 of the primer insert is a primer recess 38 that extends toward the bottom surface 34. A primer flash aperture 40 is located in the primer recess 38 and extends through the bottom surface 34 into the interior of the middle body component 28 to form a powder chamber 14. The coupling end 22 extends the polymer through the primer flash aperture 40 to form an aperture coating 42 while retaining a passage from the top surface 36 through the bottom surface 34 and into the powder chamber 14 to provide support, communication and protection about the primer flash aperture 40. The middle body component 28 extends through the flash aperture 40 into the primer recess 38 and into a primer recess groove 39. The middle body component 28 typically has a wall thickness between about 0.002 and about 0.400 inches and between 0.003 and about 0.200 inches more preferably between about 0.005 and more preferably between about 0.150 inches about 0.010 and about 0.050 inches. The projectile aperture 16, the middle body 28 and the overmolded bottom surface 34 define the interior of a powder/propellant chamber 14 in which the powder charge (not shown) is contained. The interior volume of powder/propellant chamber 14 may be varied to provide the desired volume of powder/propellant to achieve the desired goal, e.g., fps, pressure, etc. Any powder/propellant known to the skilled artisan can be used. Generally, either a particulate or consolidated propellant is used. The primer insert 32 also has a flange 46 and a primer recess 38 formed therein for ease of insertion of the primer (not shown). The primer recess 38 is sized to receive a primer (not shown) in an interference fit during assembly. A diffuser (not shown) may be placed between the primer (not shown) and the bottom of the primer recess 38. The diffuser may be of any diameter, thickness and material. A primer flash hole 40 communicates through the bottom surface 34 of primer insert 32 into the powder chamber 14 so that upon detonation of the primer (not shown), the powder in the powder chamber 14 will be ignited. The projectile (not shown) is held in place within the neck 26 at forward the projectile aperture 16 by an interference fit, mechanical crimping, adhesive, bonding welding, or etc. to increase the bullet pull force.

In another embodiment, the polymer casing (not shown) includes an open-ended middle body component (not shown) that terminates in a projectile aperture (not shown) that fits a projectile (not shown) directly and does not need a nose (not shown) to reduce the diameter from the cartridge (not shown) diameter to the projectile aperture (not shown) diameter. The middle body component (not shown) extends from a projectile aperture (not shown) to coupling element (not shown). The bullet (not shown) may be inserted into the projectile aperture 16 following the insertion of the diffuser (not shown) and primer (not shown) into the primer recess (not shown) and the addition of the propellant (not shown) to the propellant/powder chamber 14. The projectile (not shown) can be fitted into the projectile aperture 16 prior to welding or bonding together using solvent, adhesive, spin-welding, vibration-welding, ultrasonic-welding or laser-welding techniques. The welding or bonding increases the joint strength between the polymer cartridge 12 and the projectile (not shown) to produce the desired projectile (not shown) retention (i.e., bullet pull). An optional first and/or second annular groove (cannelures) may be provided in the neck 26 in the interlock surface of the male coupling element to provide a snap-fit between the two components. The cannelures (not shown) formed in a surface of the bullet (not shown) at a location determined to be the optimal seating depth for the bullet (not shown). Once the bullet (not shown) is inserted into the polymeric nose 18 at the proper depth the bullet (not shown) is locked into the proper location. Another embodiment includes positioning the bullet (not shown) into the polymeric nose 18 and crimping the neck 26 into the cannelures. The polymeric nose 18 and middle body component 28 can also be welded or bonded together using solvent, adhesive, spin-welding, vibration-welding, ultrasonic-welding or laser-welding techniques at the nose joint 20 and the case joint 19. The welding or bonding increases the joint strength so the casing can be extracted from the hot gun casing after firing at the cook-off temperature without failure of the polymer cartridge 12.

Figure 4:
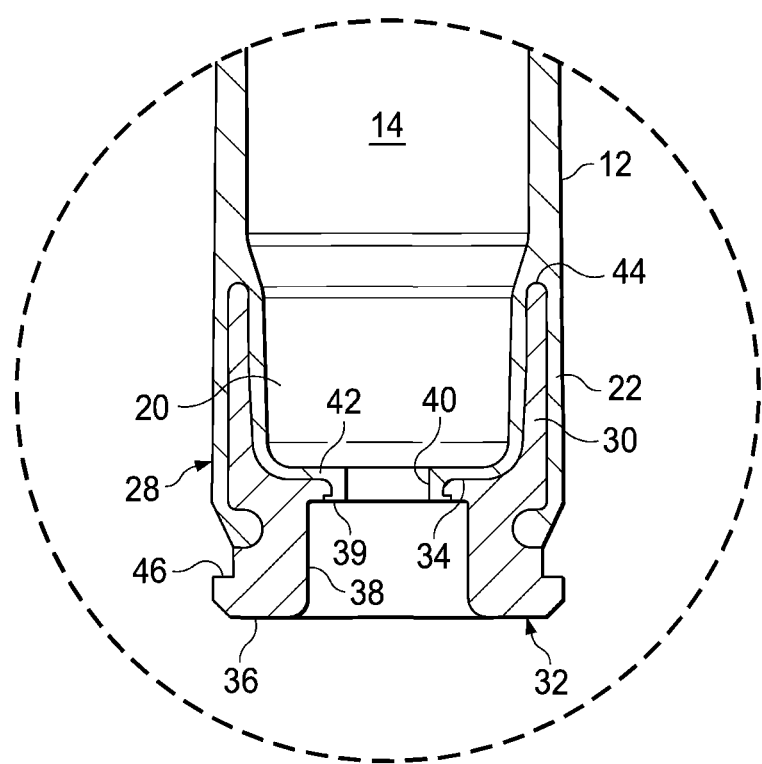
FIG. 4 depicts a side, cross-sectional view of a portion of the polymeric cartridge case according to one embodiment of the present invention.

FIG. 4 depicts a side, cross-sectional view of a portion of the polymeric cartridge case according to one embodiment of the present invention shown in FIG. 3. FIG. 4 shows a portion of a polymer casing 12 showing a powder chamber 14 and the primer insert 32. The primer insert 32 includes a coupling element 30 extending from a bottom surface 34 that is opposite a top surface 36. Located in the top surface 36 is a primer recess 38 that extends toward the bottom surface 34. A primer flash aperture 40 is located in the primer recess 38 and extends through the bottom surface 34 into the powder chamber 14. The coupling end 22 extends the polymer over the coupling element 30 and through the primer flash aperture 40 to form an aperture coating 42 that retains the passage from the top surface 36 through the bottom surface 34 and into the powder chamber 14 while providing support and protection about the primer flash aperture 40. When contacted the middle body component 28 interlocks with the coupling element 30 that extends with a taper to a smaller diameter at the tip 44 and forms a physical interlock between the primer insert 32 and middle body component 28. The middle body component 28 extends through the flash aperture 40 into the primer recess 38 into a primer recess groove 39 located around the flash aperture 40 in the primer recess 38. Coupling end 22 is shown as a female element, but may also be configured as a male element in alternate embodiments of the invention. A diffuser maybe placed in the primer recess against the primer recess groove 39 and the primer (not shown).

Figure 5:
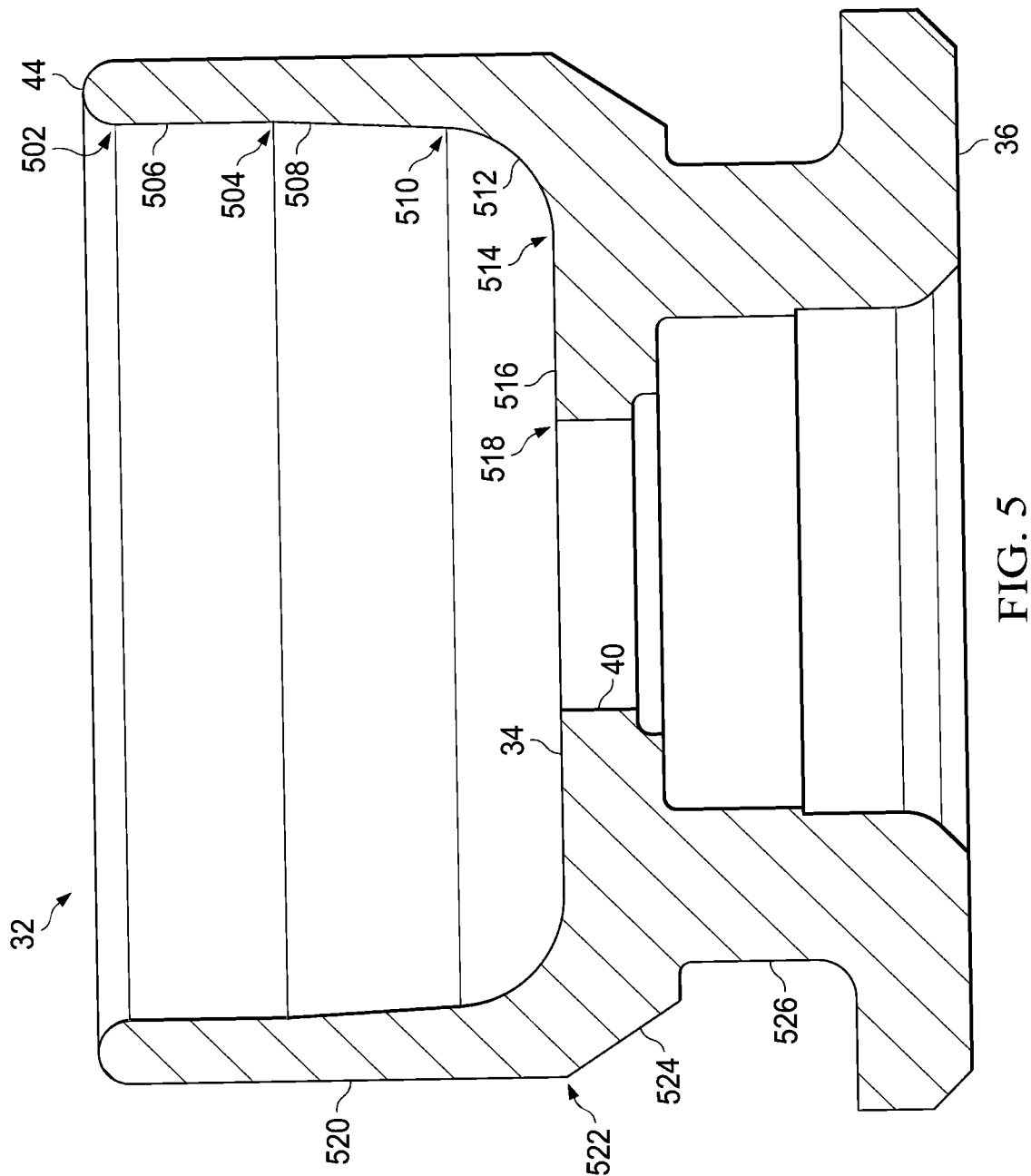
FIG. 5 depicts a side, cross-sectional view of a primer insert according to one embodiment of the present invention.

FIG. 5 depicts a side, cross-sectional view of a primer insert 32 according to one embodiment of the present invention. The primer insert 32 includes a coupling element 30 extending from a bottom surface 34 that is opposite a top surface 36 and terminate at a tip 44. The tip 44 includes an end 502 separated from a first point 504 by a first segment 506. The first segment 506 has a first segment angle and a first segment length. A second segment 508 extends from the first point 504 to a second point 510. The second segment 508 has a second segment angle and second segment length. A transition segment 512 extends from the second point 510 to a third point 514. The transition segment 512 transitions from a vertical position to a horizontal position. The transition segment 512 may be one or more straight segments, curved segments, radius or other free formed segments, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 65, 70, 75, 80, 85, 90, 95 or more until it approaches or can be functionally viewed as a curves surface to achieve a radius from 0.02-0.2. A third segment 516 extends from the third point 514 to a fourth point 518 to form a third segment length with a third segment angle of 80 and 100 degrees relative to the first segment angle. In other embodiments, the first segment 506, the second segment 508, third segment 516 may be subdivide into multiple segments (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 65, 70, 75, 80, 85, 90, 95 or more) with each having independent angles and provide the same function without departing from the scope of the instant invention.

The first segment 506 may have a first segment angle between ±6 degrees from perpendicular to the top surface 36 and a first segment distance of 0.10±0.08. The first segment 506 length may be 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.2 and variable increment of 0.001-0.010. Similarly the first segment 506 may have an angle of −6, −5.75, −5.5, −5.25, −5.0, −4.75, −4.5, −4.25, −3.75, −3.5, −3.25, −2.75, −2.5, −2.25, −1.75, −1.5, −1.25, −0.75, −0.5, −0.25, −0.05, 0, 6, 5.75, 5.5, 5.25, 5.0, 4.75, 4.5, 4.25, 3.75, 3.5, 3.25, 2.75, 2.5, 2.25, 1.75, 1.5, 1.25, 0.75, 0.5, 0.25, 0.05, and incremental variations thereof degrees from perpendicular to the top surface 36. Individual examples include a first segment 506 length of 0.06, 0.068, 0.07, 0.079, 0.08 0.066, 0.09, 0.095, 0.10, or 0.075.

The second segment 508 may have an angle between −3 and 3 degrees relative to the first segment angle and a first segment distance of 0.10±0.08. Individual examples include a second segment 508 length of 0.07, 0.073, 0.075, 0.08, 0.083, 0.09, 0.072, 0.1, 0.102, 0.11, 0.116, or 0.12.

The transition segment 512 may be a transition equivalent to a radius of 0.02 to 0.2, e.g., 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.2 and variable increment of 0.001-0.010. Individual examples include a transition segment 512 radius of 0.05, 0.04, or 0.14.

The third segment 516 may have an angle between 80-100 degrees relative to the first segment angle and a third segment distance of necessary to extend to the flash aperture 40.

In combination, the primer insert 32 may have a height from top surface 36 to tip 44 of about 0.375 with a first segment 506 length of about 0.068 at about 0 degrees, a second segment 508 length of about 0.073 at about 3 degrees with a transition segment 512 having a radius of about 0.05. In combination, the primer insert 32 may have a height from top surface 36 to tip 44 of about 0.38 with a first segment 506 length of about 0.07 at about 0 degrees, a second segment 508 length of about 0.07 at about 3 degrees with a transition segment 512 having a radius of about 0.05. In combination, the primer insert 32 may have a height from top surface 36 to tip 44 of about 0.4 with a first segment 506 length of about 0.07 at about 0 degrees, a second segment 508 length of about 0.07 at about 3 degrees with a transition segment 512 having a radius of about 0.05. In combination, the primer insert 32 may have a height from top surface 36 to tip 44 of about 0.35 with a first segment 506 length of about 0.06 at about 0 degrees, a second segment 508 length of about 0.07 at about 3 degrees with a transition segment 512 having a radius of about 0.05. In combination, the primer insert 32 may have a height from top surface 36 to tip 44 of about 0.375 with a first segment 506 length of about 0.068 at about 2 degrees, a second segment 508 length of about 0.073 at about 3 degrees with a transition segment 512 having a radius of about 0.05. In combination, the primer insert 32 may have a height from top surface 36 to tip 44 of about 0.38 with a first segment 506 length of about 0.07 at about 2 degrees, a second segment 508 length of about 0.07 at about 3 degrees with a transition segment 512 having a radius of about 0.05. In combination, the primer insert 32 may have a height from top surface 36 to tip 44 of about 0.4 with a first segment 506 length of about 0.07 at about 2 degrees, a second segment 508 length of about 0.07 at about 3 degrees with a transition segment 512 having a radius of about 0.05. In combination, the primer insert 32 may have a height from top surface 36 to tip 44 of about 0.35 with a first segment 506 length of about 0.06 at about 2 degrees, a second segment 508 length of about 0.07 at about 3 degrees with a transition segment 512 having a radius of about 0.05. In combination, the primer insert 32 may have a height from top surface 36 to tip 44 of about 0.375 with a first segment 506 length of about 0.068 at about 0 degrees, a second segment 508 length of about 0.073 at about 5 degrees with a transition segment 512 having a radius of about 0.05. In combination, the primer insert 32 may have a height from top surface 36 to tip 44 of about 0.38 with a first segment 506 length of about 0.07 at about 0 degrees, a second segment 508 length of about 0.07 at about 5 degrees with a transition segment 512 having a radius of about 0.05. In combination, the primer insert 32 may have a height from top surface 36 to tip 44 of about 0.4 with a first segment 506 length of about 0.07 at about 0 degrees, a second segment 508 length of about 0.07 at about 5 degrees with a transition segment 512 having a radius of about 0.05. In combination, the primer insert 32 may have a height from top surface 36 to tip 44 of about 0.35 with a first segment 506 length of about 0.06 at about 0 degrees, a second segment 508 length of about 0.07 at about 5 degrees with a transition segment 512 having a radius of about 0.05.

In combination, the primer insert 32 may have a height from top surface 36 to tip 44 of about 0.360 with a first segment 506 length of about 0.079 at about 0 degrees, a second segment 508 length of about 0.083 at about 3 degrees with a transition segment 512 having a radius of about 0.04. In combination, the primer insert 32 may have a height from top surface 36 to tip 44 of about 0.40 with a first segment 506 length of about 0.08 at about 0 degrees, a second segment 508 length of about 0.08 at about 3 degrees with a transition segment 512 having a radius of about 0.04. In combination, the primer insert 32 may have a height from top surface 36 to tip 44 of about 0.40 with a first segment 506 length of about 0.08 at about 2 degrees, a second segment 508 length of about 0.08 at about 3 degrees with a transition segment 512 having a radius of about 0.04. In combination, the primer insert 32 may have a height from top surface 36 to tip 44 of about 0.40 with a first segment 506 length of about 0.08 at about 0 degrees, a second segment 508 length of about 0.08 at about 5 degrees with a transition segment 512 having a radius of about 0.04. In combination, the primer insert 32 may have a height from top surface 36 to tip 44 of about 0.40 with a first segment 506 length of about 0.08 at about 2 degrees, a second segment 508 length of about 0.08 at about 6 degrees with a transition segment 512 having a radius of about 0.04. In combination, the primer insert 32 may have a height from top surface 36 to tip 44 of about 0.350 with a first segment 506 length of about 0.07 at about 0 degrees, a second segment 508 length of about 0.085 at about 3 degrees with a transition segment 512 having a radius of about 0.04. In combination, the primer insert 32 may have a height from top surface 36 to tip 44 of about 0.350 with a first segment 506 length of about 0.07 at about 2 degrees, a second segment 508 length of about 0.085 at about 3 degrees with a transition segment 512 having a radius of about 0.04. In combination, the primer insert 32 may have a height from top surface 36 to tip 44 of about 0.350 with a first segment 506 length of about 0.07 at about 0 degrees, a second segment 508 length of about 0.085 at about 5 degrees with a transition segment 512 having a radius of about 0.04. In combination, the primer insert 32 may have a height from top surface 36 to tip 44 of about 0.350 with a first segment 506 length of about 0.07 at about 2 degrees, a second segment 508 length of about 0.085 at about 6 degrees with a transition segment 512 having a radius of about 0.04.

In combination, the primer insert 32 may have a height from top surface 36 to tip 44 of about 0.375 with a first segment 506 length of about 0.066 at about 0 degrees, a second segment 508 length of about 0.072 at about 3 degrees with a transition segment 512 having a radius of about 0.05. In combination, the primer insert 32 may have a height from top surface 36 to tip 44 of about 0.37 with a first segment 506 length of about 0.06 at about 0 degrees, a second segment 508 length of about 0.07 at about 3 degrees with a transition segment 512 having a radius of about 0.05. In combination, the primer insert 32 may have a height from top surface 36 to tip 44 of about 0.37 with a first segment 506 length of about 0.06 at about 2 degrees, a second segment 508 length of about 0.07 at about 3 degrees with a transition segment 512 having a radius of about 0.05. In combination, the primer insert 32 may have a height from top surface 36 to tip 44 of about 0.37 with a first segment 506 length of about 0.06 at about 0 degrees, a second segment 508 length of about 0.07 at about 5 degrees with a transition segment 512 having a radius of about 0.05. In combination, the primer insert 32 may have a height from top surface 36 to tip 44 of about 0.37 with a first segment 506 length of about 0.06 at about 2 degrees, a second segment 508 length of about 0.07 at about 6 degrees with a transition segment 512 having a radius of about 0.05. In combination, the primer insert 32 may have a height from top surface 36 to tip 44 of about 0.38 with a first segment 506 length of about 0.07 at about 0 degrees, a second segment 508 length of about 0.07 at about 3 degrees with a transition segment 512 having a radius of about 0.05. In combination, the primer insert 32 may have a height from top surface 36 to tip 44 of about 0.38 with a first segment 506 length of about 0.07 at about 2 degrees, a second segment 508 length of about 0.07 at about 3 degrees with a transition segment 512 having a radius of about 0.05. In combination, the primer insert 32 may have a height from top surface 36 to tip 44 of about 0.38 with a first segment 506 length of about 0.07 at about 0 degrees, a second segment 508 length of about 0.07 at about 5 degrees with a transition segment 512 having a radius of about 0.05. In combination, the primer insert 32 may have a height from top surface 36 to tip 44 of about 0.38 with a first segment 506 length of about 0.07 at about 2 degrees, a second segment 508 length of about 0.07 at about 6 degrees with a transition segment 512 having a radius of about 0.05. In combination, the primer insert 32 may have a height from top surface 36 to tip 44 of about 0.3 with a first segment 506 length of about 0.07 at about 0 degrees, a second segment 508 length of about 0.07 at about 3 degrees with a transition segment 512 having a radius of about 0.05. In combination, the primer insert 32 may have a height from top surface 36 to tip 44 of about 0.3 with a first segment 506 length of about 0.07 at about 2 degrees, a second segment 508 length of about 0.07 at about 3 degrees with a transition segment 512 having a radius of about 0.05. In combination, the primer insert 32 may have a height from top surface 36 to tip 44 of about 0.3 with a first segment 506 length of about 0.07 at about 0 degrees, a second segment 508 length of about 0.07 at about 5 degrees with a transition segment 512 having a radius of about 0.05. In combination, the primer insert 32 may have a height from top surface 36 to tip 44 of about 0.3 with a first segment 506 length of about 0.07 at about 2 degrees, a second segment 508 length of about 0.07 at about 6 degrees with a transition segment 512 having a radius of about 0.05.

In combination, the primer insert 32 may have a height from top surface 36 to tip 44 of about 0.645 with a first segment 506 length of about 0.095 at about 0 degrees, a second segment 508 length of about 0.102 at about 3 degrees with a transition segment 512 having a radius of about 0.14. In combination, the primer insert 32 may have a height from top surface 36 to tip 44 of about 0.6 with a first segment 506 length of about 0.1 at about 0 degrees, a second segment 508 length of about 0.1 at about 3 degrees with a transition segment 512 having a radius of about 0.14. In combination, the primer insert 32 may have a height from top surface 36 to tip 44 of about 0.6 with a first segment 506 length of about 0.1 at about 2 degrees, a second segment 508 length of about 0.1 at about 3 degrees with a transition segment 512 having a radius of about 0.14. In combination, the primer insert 32 may have a height from top surface 36 to tip 44 of about 0.6 with a first segment 506 length of about 0.1 at about 0 degrees, a second segment 508 length of about 0.1 at about 5 degrees with a transition segment 512 having a radius of about 0.14. In combination, the primer insert 32 may have a height from top surface 36 to tip 44 of about 0.6 with a first segment 506 length of about 0.1 at about 2 degrees, a second segment 508 length of about 0.1 at about 6 degrees with a transition segment 512 having a radius of about 0.14. In combination, the primer insert 32 may have a height from top surface 36 to tip 44 of about 0.65 with a first segment 506 length of about 0.09 at about 2 degrees, a second segment 508 length of about 0.09 at about 3 degrees with a transition segment 512 having a radius of about 0.14. In combination, the primer insert 32 may have a height from top surface 36 to tip 44 of about 0.65 with a first segment 506 length of about 0.09 at about 0 degrees, a second segment 508 length of about 0.09 at about 6 degrees with a transition segment 512 having a radius of about 0.14. In combination, the primer insert 32 may have a height from top surface 36 to tip 44 of about 0.65 with a first segment 506 length of about 0.09 at about 3 degrees, a second segment 508 length of about 0.09 at about 6 degrees with a transition segment 512 having a radius of about 0.14. In combination, the primer insert 32 may have a height from top surface 36 to tip 44 of about 0.7 with a first segment 506 length of about 0.1 at about 0 degrees, a second segment 508 length of about 0.1 at about 3 degrees with a transition segment 512 having a radius of about 0.14. In combination, the primer insert 32 may have a height from top surface 36 to tip 44 of about 0.7 with a first segment 506 length of about 0.1 at about 3 degrees, a second segment 508 length of about 0.1 at about 3 degrees with a transition segment 512 having a radius of about 0.14. In combination, the primer insert 32 may have a height from top surface 36 to tip 44 of about 0.7 with a first segment 506 length of about 0.1 at about 0 degrees, a second segment 508 length of about 0.1 at about 6 degrees with a transition segment 512 having a radius of about 0.14. In combination, the primer insert 32 may have a height from top surface 36 to tip 44 of about 0.7 with a first segment 506 length of about 0.1 at about 2 degrees, a second segment 508 length of about 0.1 at about 6 degrees with a transition segment 512 having a radius of about 0.14.

In combination, the primer insert 32 may have a height from top surface 36 to tip 44 of about 0.644 with a first segment 506 length of about 0.075 at about 0 degrees, a second segment 508 length of about 0.116 at about 3 degrees with a transition segment 512 having a radius of about 0.14. In combination, the primer insert 32 may have a height from top surface 36 to tip 44 of about 0.644 with a first segment 506 length of about 0.075 at about 3 degrees, a second segment 508 length of about 0.116 at about 3 degrees with a transition segment 512 having a radius of about 0.14. In combination, the primer insert 32 may have a height from top surface 36 to tip 44 of about 0.644 with a first segment 506 length of about 0.075 at about 0 degrees, a second segment 508 length of about 0.116 at about 6 degrees with a transition segment 512 having a radius of about 0.14. In combination, the primer insert 32 may have a height from top surface 36 to tip 44 of about 0.644 with a first segment 506 length of about 0.075 at about 3 degrees, a second segment 508 length of about 0.116 at about 6 degrees with a transition segment 512 having a radius of about 0.14. In combination, the primer insert 32 may have a height from top surface 36 to tip 44 of about 0.6 with a first segment 506 length of about 0.08 at about 0 degrees, a second segment 508 length of about 0.12 at about 3 degrees with a transition segment 512 having a radius of about 0.14. In combination, the primer insert 32 may have a height from top surface 36 to tip 44 of about 0.6 with a first segment 506 length of about 0.08 at about 3 degrees, a second segment 508 length of about 0.12 at about 3 degrees with a transition segment 512 having a radius of about 0.14. In combination, the primer insert 32 may have a height from top surface 36 to tip 44 of about 0.6 with a first segment 506 length of about 0.08 at about 0 degrees, a second segment 508 length of about 0.12 at about 6 degrees with a transition segment 512 having a radius of about 0.14. In combination, the primer insert 32 may have a height from top surface 36 to tip 44 of about 0.6 with a first segment 506 length of about 0.08 at about 3 degrees, a second segment 508 length of about 0.12 at about 6 degrees with a transition segment 512 having a radius of about 0.14. In combination, the primer insert 32 may have a height from top surface 36 to tip 44 of about 0.65 with a first segment 506 length of about 0.08 at about 0 degrees, a second segment 508 length of about 0.1 at about 3 degrees with a transition segment 512 having a radius of about 0.14. In combination, the primer insert 32 may have a height from top surface 36 to tip 44 of about 0.65 with a first segment 506 length of about 0.08 at about 2 degrees, a second segment 508 length of about 0.1 at about 3 degrees with a transition segment 512 having a radius of about 0.14. In combination, the primer insert 32 may have a height from top surface 36 to tip 44 of about 0.65 with a first segment 506 length of about 0.08 at about 0 degrees, a second segment 508 length of about 0.1 at about 6 degrees with a transition segment 512 having a radius of about 0.14. In combination, the primer insert 32 may have a height from top surface 36 to tip 44 of about 0.65 with a first segment 506 length of about 0.08 at about 3 degrees, a second segment 508 length of about 0.1 at about 6 degrees with a transition segment 512 having a radius of about 0.14. In combination, the primer insert 32 may have a height from top surface 36 to tip 44 of about 0.7 with a first segment 506 length of about 0.075 at about 0 degrees, a second segment 508 length of about 0.1 at about 3 degrees with a transition segment 512 having a radius of about 0.14. In combination, the primer insert 32 may have a height from top surface 36 to tip 44 of about 0.7 with a first segment 506 length of about 0.075 at about 2 degrees, a second segment 508 length of about 0.1 at about 3 degrees with a transition segment 512 having a radius of about 0.14. In combination, the primer insert 32 may have a height from top surface 36 to tip 44 of about 0.7 with a first segment 506 length of about 0.075 at about 0 degrees, a second segment 508 length of about 0.1 at about 6 degrees with a transition segment 512 having a radius of about 0.14. In combination, the primer insert 32 may have a height from top surface 36 to tip 44 of about 0.7 with a first segment 506 length of about 0.075 at about 3 degrees, a second segment 508 length of about 0.1 at about 6 degrees with a transition segment 512 having a radius of about 0.14.

The primer insert 32 also includes a first outer segment 520 that extends from the end 502 to a first outer point 522 to define a first outer segment length and a first outer segment angle. The first outer segment 520 may be subdivide into multiple segments (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 65, 70, 75, 80, 85, 90, 95 or more) with each having independent angles and provide the same function without departing from the scope of the instant invention. The first outer angle may be between −15 and 15 degrees from perpendicular to the top surface 36. An outer transition segment 524 is formed between the first outer point 522 and a side wall 526. The outer transition segment 524 may be one or more segment that are individually a curve, radius, straight, free-formed or other segments, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 65, 70, 75, 80, 85, 90, 95 or more to transition from the first outer segment 520 to the side wall 526.

Figure 6:
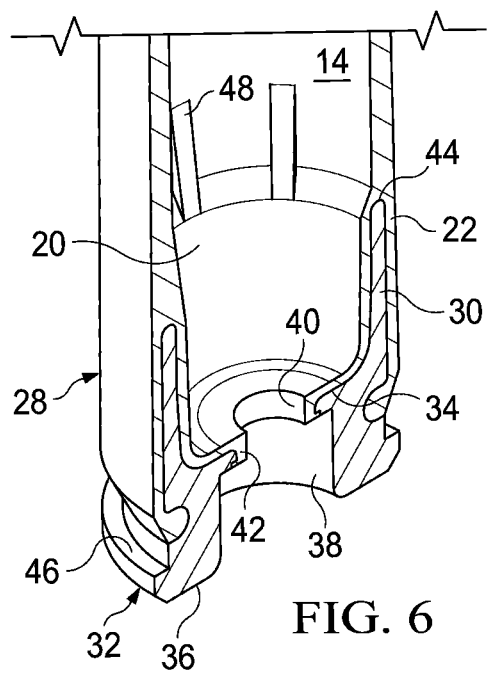
FIG. 6 depicts a side, cross-sectional view of a portion of the polymeric cartridge case displaying ribs according to one embodiment of the present invention.

FIG. 6 depicts a side, cross-sectional view of a portion of the polymeric cartridge case displaying ribs according to one embodiment of the present invention. FIG. 6 depicts a portion of a polymer casing having a shortened insert, angled coupling elements and internal ribs. The primer insert 32 includes a coupling element 30 extending from a bottom surface 34 that is opposite a top surface 36. Located in the top surface 36 is a primer recess 38 that extends toward the bottom surface 34. A primer flash aperture 40 is located in the primer recess 38 and extends through the bottom surface 34 into the powder chamber 14. The coupling end 22 extends the polymer over the coupling element 30 and through the primer flash aperture 40 to form an aperture coating 42 that retains the passage from the top surface 36 through the bottom surface 34 and into the powder chamber 14 while providing support and protection about the primer flash aperture 40. When contacted the middle body component 28 interlocks with the coupling element 30 that extends with a taper to a smaller diameter at the tip 44 and forms a physical interlock between the primer insert 32 and middle body component 28. The middle body component 28 extends through the flash aperture 40 into the primer recess 38 into a primer recess groove 39 located around the flash aperture 40 in the primer recess 38. Coupling end 22 is shown as a female element, but may also be configured as a male element in alternate embodiments of the invention. A diffuser maybe placed in the primer recess against the primer recess groove 39 and the primer (not shown). The substantially cylindrical opposite end 20 or anywhere within the powder chamber 14 may include one or more ribs 48 on the surface. The number of ribs 48 will depend on the specific application and desire of the manufacture but may include 1, 2, 3, 4, 5 6, 7, 8, 9, 10, or more ribs. In the counter bore, the polymer was having difficulty filling this area due to the fact that the polymer used has fillers in it, and needed to be reblended during molding. One embodiment includes six ribs 48 to create turbulence in the flow of the polymer, thus allowing the material to fill the counter bore. Another embodiment of the instant invention is a shortened insert and angled coupling element 30 inside of the insert. In addition, raised portions of the polymer at the flash hole, lowered and angled the internal polymer wall to match the insert and lengthened the internal ribs.

Figure 7:
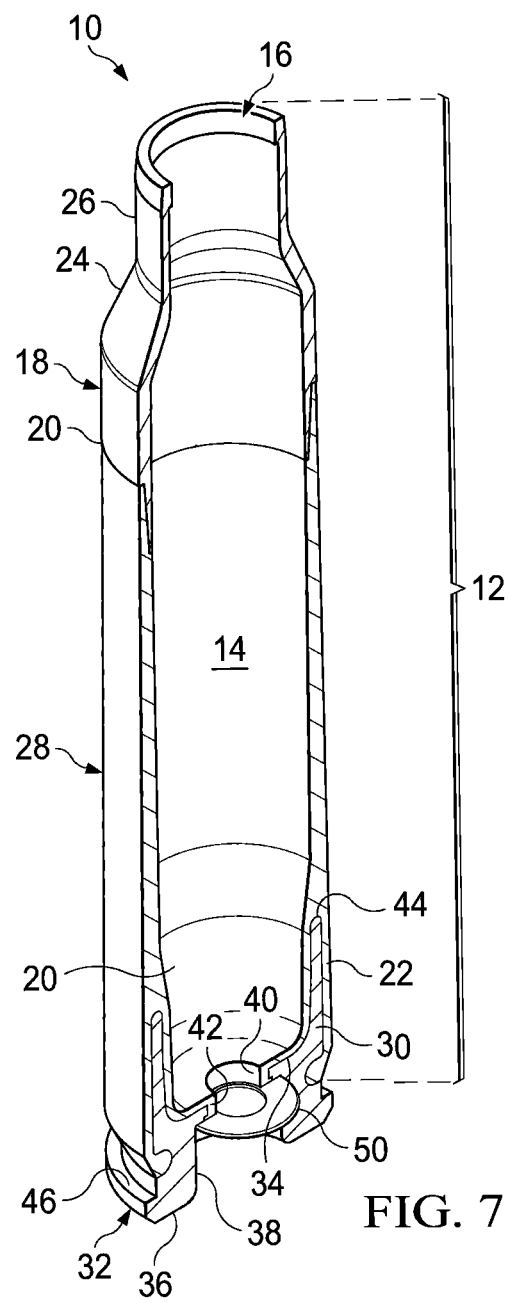
FIG. 7 depicts a side, cross-sectional view of a polymeric cartridge case having a diffuser according to one embodiment of the present invention.

FIG. 7 depicts a side, cross-sectional view of a polymeric cartridge case having a diffuser according to one embodiment of the present invention. The diffuser 50 is a device that is used to divert the effects of the primer off of the polymer and directing it to the flash hole. The affects being the impact from igniting the primer as far as pressure and heat. The ammunition cartridge 10 is shown with a polymer casing 12 having a powder/propellant chamber 14 with a projectile aperture 16 at one end and an overmolded primer insert 32 at the other. The polymeric nose 18 extending from projectile aperture 16 toward the nose joint 20 which are separated by a neck 26 and a shoulder 24. The nose joint 20 may be configured in various designs that allow the joining of the polymeric nose 18 to the middle body component 28. For example, the joint 20 may be a butt joint, a bevel lap splice joint, a half lap joint, a lap joint, a square joint, a single bevel joint, double bevel joint, single J joint, double J joint, single v joint, double v joint, single U joint, double U joint, flange joint, tee joint, flare joint, edge joint, rabbit joint, dado and any other joint. In addition, the joint type may be modified to allow a gap at regions in the joint. For example, a dado joint may be formed where the fit is not square allowing gaps to form at the corner of the dado. Similarly, a compound joint may be used, e.g., rabbit joint transitioning to a butt joint transitioning to a bevel joint (modified to have a gap in the fit) transitioning to a butt joint and ending in a lap joint or rabbit joint. In addition the angle of the joint need not be at 90 and 180 degrees. The joint angle may be at any angle from 0-180 degrees and may vary along the joint. For instance the joint may start at a 0 degree move to a +45 degree angle transition to a −40 degree angle and conclude by tapering at a 10 degree angle. The polymeric nose 18 typically has a wall thickness between about 0.003 and about 0.200 inches and preferably between about 0.005 and more preferably between about 0.150 inches about 0.010 and about 0.050 inches. The middle body component 28 is formed by molding a case joint 19 at one end and overmolding the primer insert 32 at the other. A coupling element 30 extending from a bottom surface 34 that is opposite a top surface 36. The middle body component 28 overmolds the coupling element 30 of the insert 32. The coupling element 30, as shown, is configured as a male element, however, all combinations of male and female configurations are acceptable for coupling elements 30. Located in the top surface 36 of the primer insert is a primer recess 38 that extends toward the bottom surface 34. A primer flash aperture 40 is located in the primer recess 38 and extends through the bottom surface 34 into the interior of the middle body component 28 to form a powder chamber 14. The coupling end 22 extends the polymer through the primer flash aperture 40 to form an aperture coating 42 while retaining a passage from the top surface 36 through the bottom surface 34 and into the powder chamber 14 to provide support, communication and protection about the primer flash aperture 40. The middle body component 28 extends through the flash aperture 40 into the primer recess 38 and into a primer recess groove 39. The middle body component 28 typically has a wall thickness between about 0.002 and about 0.400 inches and between 0.003 and about 0.200 inches more preferably between about 0.005 and more preferably between about 0.150 inches about 0.010 and about 0.050 inches. The projectile aperture 16, the middle body 28 and the overmolded bottom surface 34 define the interior of a powder/propellant chamber 14 in which the powder charge (not shown) is contained. The interior volume of powder/propellant chamber 14 may be varied to provide the desired volume of powder/propellant to achieve the desired goal, e.g., fps, pressure, etc. Any powder/propellant known to the skilled artisan can be used. Generally, either a particulate or consolidated propellant is used. The primer insert 32 also has a flange 46 and a primer recess 38 formed therein for ease of insertion of the primer (not shown). The primer recess 38 is sized to receive a primer (not shown) in an interference fit during assembly. A diffuser 50 may be placed between the primer (not shown) and the bottom of the primer recess 38. The diffuser 50 includes a diffuser aperture 52 that aligns with the primer flash aperture 40. The diffuser 50 is a device that is used to divert the affects of the primer (not shown) off of the polymer. The affects being the impact from igniting the primer as far as pressure and heat to divert the energy of the primer off of the polymer and directing it to the flash hole. The diffuser 50 may be of any diameter, thickness and material. A primer flash hole 40 communicates through the bottom surface 34 of primer insert 32 into the powder chamber 14 so that upon detonation of the primer (not shown), the powder in the powder chamber 14 will be ignited. The projectile (not shown) is held in place within the neck 26 at forward the projectile aperture 16 by an interference fit, mechanical crimping, adhesive, bonding welding, or etc. to increase the bullet pull force.

Figure 8:
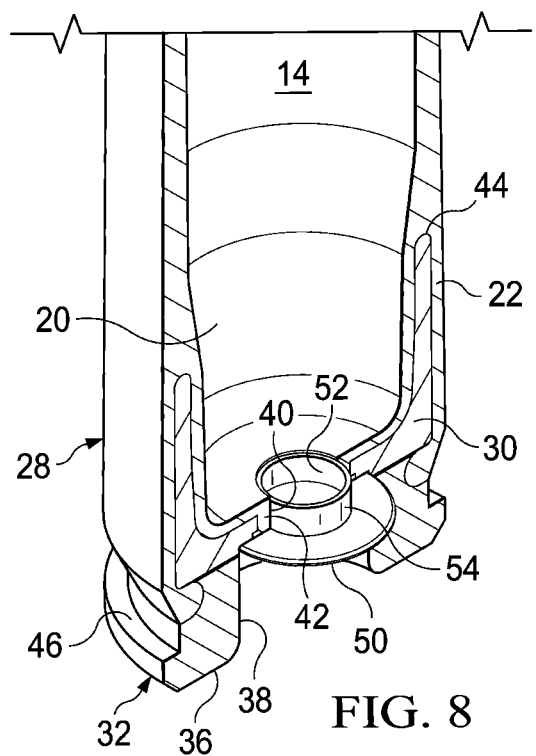
FIG. 8 depicts a side, cross-sectional view of a portion of the polymeric cartridge case having a diffuser according to one embodiment of the present invention.
Figure 9A:
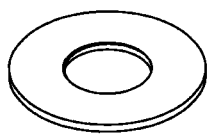
FIGS. 9a-9h depict diffuser according to a different embodiment of the present invention.
Figure 9B:
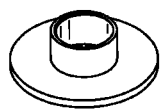
Figure 9C:
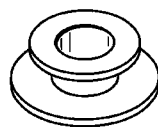
Figure 9D:
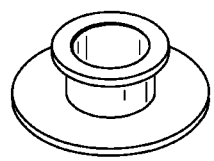
Figure 9E:
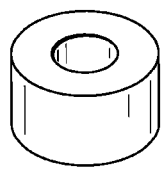
Figure 9F:
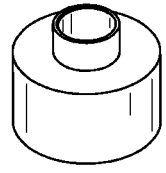
Figure 9G:
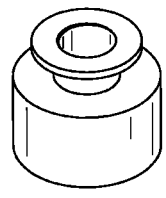
Figure 9H:
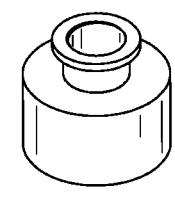

FIG. 8 depicts a side, cross-sectional view of a portion of the polymeric cartridge case having a diffuser according to one embodiment of the present invention. FIG. 8 shows a portion of a polymer casing 12 showing a powder chamber 14 and the primer insert 32. The primer insert 32 includes a coupling element 30 extending from a bottom surface 34 that is opposite a top surface 36. Located in the top surface 36 is a primer recess 38 that extends toward the bottom surface 34. A primer flash aperture 40 is located in the primer recess 38 and extends through the bottom surface 34 into the powder chamber 14. The coupling end 22 extends the polymer over the coupling element 30 and through the primer flash aperture 40 to form an aperture coating 42 that retains the passage from the top surface 36 through the bottom surface 34 and into the powder chamber 14 while providing support and protection about the primer flash aperture 40. When contacted the middle body component 28 interlocks with the coupling element 30 that extends with a taper to a smaller diameter at the tip 44 and forms a physical interlock between the primer insert 32 and middle body component 28. The middle body component 28 extends through the flash aperture 40 into the primer recess 38 into a primer recess groove 39 located around the flash aperture 40 in the primer recess 38. Coupling end 22 is shown as a female element, but may also be configured as a male element in alternate embodiments of the invention. A diffuser 50 maybe placed in the primer recess against the primer recess groove 39 and the primer (not shown). The diffuser 50 includes a diffuser aperture 52 and a diffuser aperture extension 54 that aligns with the primer flash aperture 40. The diffuser 50 is a device that is used to divert the affects of the primer (not shown) off of the polymer. The affects being the impact from igniting the primer as far as pressure and heat to divert the energy of the primer off of the polymer and directing it to the flash hole. The diffuser 50 can be between 0.004 to 0.010 inches in thickness and made from half hard brass. For example, the diffuser 50 can be between 0.005 inches thick for a 5.56 diffuser 50. The OD of the diffuser for a 5.56 or 223 case is 0.173 and the ID is 0.080. The Diffuser could be made of any material that can withstand the energy from the ignition of the primer. This would include steel, stainless, cooper, aluminum or even an engineered resin that was injection molded or stamped. The Diffuser can be produce in T shape by drawing the material with a stamping and draw die. In the T Diffuser the center ring can be 0.005 to 0.010 tall and the OD is 0.090 and the ID 0.080.

FIGS. 9*a*-9*h* depict different embodiment of the diffuser of the present invention.

The polymeric and composite casing components may be injection molded. Polymeric materials for the bullet-end and middle body components must have propellant compatibility and resistance to gun cleaning solvents and grease, as well as resistance to chemical, biological and radiological agents. The polymeric materials must have a temperature resistance higher than the cook-off temperature of the propellant, typically about 320° F. The polymeric materials must have elongation-to-break values that to resist deformation under interior ballistic pressure as high as 60,000 psi in all environments (temperatures from about −65 to about 320° F. and humidity from 0 to 100% RH). According to one embodiment, the middle body component is either molded onto or snap-fit to the casing head-end component after which the bullet-end component is snap-fit or interference fit to the middle body component. The components may be formed from high-strength polymer, composite or ceramic.

Examples of suitable high strength polymers include composite polymer material including a tungsten metal powder, nylon 6/6, nylon 6, and glass fibers; and a specific gravity in a range of 3-10. The tungsten metal powder may be 50%-96% of a weight of the bullet body. The polymer material also includes about 0.5-15%, preferably about 1-12%, and most preferably about 2-9% by weight, of nylon 6/6, about 0.5-15%, preferably about 1-12%, and most preferably about 2-9% by weight, of nylon 6, and about 0.5-15%, preferably about 1-12%, and most preferably about 2-9% by weight, of glass fibers. It is most suitable that each of these ingredients be included in amounts less than 10% by weight. The cartridge casing body may be made of a modified ZYTEL resin, available from E.I. DuPont De Nemours Co., a modified 612 nylon resin, modified to increase elastic response.

Examples of suitable polymers include polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, or urethane hybrids. Examples of suitable polymers also include aliphatic or aromatic polyamide, polyeitherimide, polysulfone, polyphenylsulfone, poly-phenylene oxide, liquid crystalline polymer and polyketone. Examples of suitable composites include polymers such as polyphenylsulfone reinforced with between about 30 and about 70 wt %, and preferably up to about 65 wt % of one or more reinforcing materials selected from glass fiber, ceramic fiber, carbon fiber, mineral fillers, organo nanoclay, or carbon nanotube. Preferred reinforcing materials, such as chopped surface-treated E-glass fibers provide flow characteristics at the above-described loadings comparable to unfilled polymers to provide a desirable combination of strength and flow characteristics that permit the molding of head-end components. Composite components can be formed by machining or injection molding. Finally, the cartridge case must retain sufficient joint strength at cook-off temperatures. More specifically, polymers suitable for molding of the projectile-end component have one or more of the following properties: Yield or tensile strength at −65° F.>10,000 psi Elongation-to-break at −65° F.>15% Yield or tensile strength at 73° F.>8,000 psi Elongation-to-break at 73° F.>50% Yield or tensile strength at 320° F.>4,000 psi Elongation-to-break at 320° F.>80%. Polymers suitable for molding of the middle-body component have one or more of the following properties: Yield or tensile strength at −65° F.>10,000 psi Yield or tensile strength at 73° F.>8,000 psi Yield or tensile strength at 320° F.>4,000 psi.

Commercially available polymers suitable for use in the present invention thus include polyphenylsulfones; copolymers of polyphenylsulfones with polyether-sulfones or polysulfones; copolymers and blends of polyphenylsulfones with polysiloxanes; poly(etherimide-siloxane); copolymers and blends of polyetherimides and polysiloxanes, and blends of polyetherimides and poly(etherimide-siloxane) copolymers; and the like. Particularly preferred are polyphenylsulfones and their copolymers with poly-sulfones or polysiloxane that have high tensile strength and elongation-to-break to sustain the deformation under high interior ballistic pressure. Such polymers are commercially available, for example, RADEL R5800 polyphenylesulfone from Solvay Advanced Polymers. The polymer can be formulated with up to about 10 wt % of one or more additives selected from internal mold release agents, heat stabilizers, anti-static agents, colorants, impact modifiers and UV stabilizers.

The polymers of the present invention can also be used for conventional two-piece metal-plastic hybrid cartridge case designs and conventional shotgun shell designs. One example of such a design is an ammunition cartridge with a one-piece substantially cylindrical polymeric cartridge casing body with an open projectile-end and an end opposing the projectile-end with a male or female coupling element; and a cylindrical metal cartridge casing head-end component with an essentially closed base end with a primer hole opposite an open end having a coupling element that is a mate for the coupling element on the opposing end of the polymeric cartridge casing body joining the open end of the head-end component to the opposing end of the polymeric cartridge casing body. The high polymer ductility permits the casing to resist breakage.

One embodiment includes a 2 cavity prototype mold having an upper portion and a base portion for a 5.56 case having a metal insert over-molded with a Nylon 6 (polymer) based material. In this embodiment the polymer in the base includes a lip or flange to extract the case from the weapon. One 2-cavity prototype mold to produce the upper portion of the 5.56 case can be made using a stripper plate tool using an Osco hot spur and two subgates per cavity. Another embodiment includes a subsonic version, the difference from the standard and the subsonic version is the walls are thicker thus requiring less powder. This will decrease the velocity of the bullet thus creating a subsonic round.

The extracting inserts is used to give the polymer case a tough enough ridge and groove for the weapons extractor to grab and pull the case out the chamber of the gun. The extracting insert is made of 17-4 ss that is hardened to 42-45rc. The insert may be made of aluminum, brass, cooper, steel or even an engineered resin with enough tensile strength.

The insert is over molded in an injection molded process using a nano clay particle filled Nylon material. The inserts can be machined or stamped. In addition, an engineered resin able to withstand the demand on the insert allows injection molded and/or even transfer molded.

One of ordinary skill in the art will know that many propellant types and weights can be used to prepare workable ammunition and that such loads may be determined by a careful trial including initial low quantity loading of a given propellant and the well known stepwise increasing of a given propellant loading until a maximum acceptable load is achieved. Extreme care and caution is advised in evaluating new loads. The propellants available have various burn rates and must be carefully chosen so that a safe load is devised.

The description of the preferred embodiments should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing"

(and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A polymer ammunition cartridge comprising:
a primer insert comprising a top surface;
a bottom surface opposite the top surface;
a coupling element that extends from the bottom surface, wherein the coupling element comprises an interior surface and an exterior surface, wherein the interior surface comprises:
a transition region that transitions from the bottom surface to a second segment wherein the transition region has a radius of from 0.1 to 0.2 inches;
a first segment extending from the second segment and terminates at a tip, wherein the first segment has a first segment distance from 0.06 to 0.14 inches and the second segment has a second segment distance from 0.05 to 0.15 inches, wherein the second segment has a second segment angle from +3 to −3 degrees relative to a first segment angle and the first segment has the first segment angle from +6 to −6 degrees from perpendicular to the top surface;
a primer recess in the top surface that extends toward the bottom surface; a primer flash aperture positioned in the primer recess through the bottom surface; and
a flash aperture groove in the primer recess and positioned around the primer flash aperture and adapted to receive a polymer overmolding through the primer flash aperture;
a polymeric middle body comprising a polymeric body extending from a body coupling over at least a portion of the primer insert, wherein the polymeric body is molded over the cylindrical coupling element and into the primer flash hole aperture and into the groove to form a primer flash hole; and
a polymer nose comprising a generally cylindrical neck having a projectile aperture at a first end; a shoulder that extends from the generally cylindrical neck; and a nose junction in communication with the shoulder, wherein the nose junction is mated to the body coupling.

2. The polymer ammunition cartridge of claim 1, wherein the transition region comprises one or more straight segments, one or more curved segments or a combination of one or more straight segments and one or more curved segments.

3. The polymer ammunition cartridge of claim 1, wherein the first segment has a first segment distance of about 0.1 inches, the second segment has a second segment distance of about 0.1 inches and the transition region is concave with a radius of about 0.14 inches.

4. The polymer ammunition cartridge of claim 3, wherein the second segment has a second segment angle of about 1 degree and the first segment has a first segment between about 0-3 degrees.

5. The polymer ammunition cartridge of claim 4, wherein the second segment angle is about 1 degree and the segment is about 3 degrees.

6. The polymer ammunition cartridge of claim 4, wherein the second segment angle is about 3 degrees and the first segment is about 0 degrees.

7. The polymer ammunition cartridge of claim 3, further comprising an insert height that extends from the top surface to the tip, wherein the insert height is about 0.6 inches; about 0.65 inches; or about 0.75 inches.

8. The polymer ammunition cartridge of claim 1, wherein the first segment has a first segment distance of about 0.085 inches, the second segment has a second segment distance of about 0.12 inches and the transition region is concave with a radius of about 0.15 inches.

9. The polymer ammunition cartridge of claim 1, further comprising an insert height that extends from the top surface to the tip, wherein the insert height is about 0.6 inches; about 0.65 inches; or about 0.75 inches.

10. The polymer ammunition cartridge of claim 1, wherein the first segment has a first segment distance of about 0.12 inches, the second segment has a second segment distance of about 0.085 inches and the transition region is concave with a radius of about 0.15 inches.

11. The polymer ammunition cartridge of claim 10, wherein the second segment has a second segment angle of about 1 degree and the first segment has a first segment of about 3 degrees.

12. The polymer ammunition cartridge of claim 10, wherein the second segment has a second segment angle of about 3 degrees and the first segment has a first segment angle of about 0 degrees.

13. The polymer ammunition cartridge of claim 1, wherein the first segment has a first segment distance of about 0.08 inches, the second segment has a second segment distance of about 0.1 inches and the transition region is concave with a radius of about 0.14 inches.

14. The polymer ammunition cartridge of claim 13, further comprising an insert height that extends from the top surface to the tip, wherein the insert height is about 0.65 inches.

15. The polymer ammunition cartridge of claim 13, further comprising an insert height that extends from the top surface to the tip, wherein the insert height is about 0.75 inches.

16. The polymer ammunition cartridge of claim 1, wherein the polymer nose, the polymeric middle body or both individually comprise a nylon polymer, polycarbonate polymer, polybutylene polymer or a mixture thereof.

17. The polymer ammunition cartridge of claim 1, wherein the polymer nose, the polymeric middle body or both individually comprise between about 10 and about 70 wt % glass fiber fillers, mineral fillers, or mixtures thereof.

18. The polymer ammunition cartridge of claim 1, further comprising an adhesive groove positioned in the projectile aperture.

19. The polymer ammunition cartridge of claim 1, wherein the polymer nose, the polymeric middle body or both individually comprise a polymers selected from the group consisting of polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of polyphenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers.

\* \* \* \* \*